(12) United States Patent
Nakamaru et al.

(10) Patent No.: US 6,810,099 B2
(45) Date of Patent: Oct. 26, 2004

(54) BOILING WATER REACTOR NUCLEAR POWER PLANT AND ITS CONSTRUCTION METHOD

(75) Inventors: Mikihide Nakamaru, Fujisawa (JP); Hideaki Heki, Yokohama (JP); Takehiko Saito, Tokyo (JP); Kouji Hiraiwa, Chigasaki (JP); Tadashi Narabayashi, Yokohama (JP); Satoru Oomizu, Yokohama (JP); Tsuyoshi Shimoda, Yokohama (JP); Kenji Arai, Kawasaki (JP); Shinichi Morooka, Tokyo (JP); Seijiro Suzuki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/978,174

(22) Filed: Oct. 17, 2001

(65) Prior Publication Data

US 2002/0085660 A1 Jul. 4, 2002

(30) Foreign Application Priority Data

Oct. 17, 2000 (JP) .................................... P2000-317169

(51) Int. Cl.[7] ................................................ G21C 9/00
(52) U.S. Cl. ....................... 376/293; 376/283; 376/298; 376/299; 376/294
(58) Field of Search ............................... 376/293, 283, 376/298, 299, 294, 287, 291, 292, 367, 282, 353, 406

(56) References Cited

U.S. PATENT DOCUMENTS 3,475,272 A * 10/1969 Fortescue .................... 176/40
4,644,780 A * 2/1987 Jeter ........................... 138/104
5,087,408 A * 2/1992 Tominaga et al. .......... 376/283
5,087,409 A * 2/1992 Wedellsborg et al. ....... 220/586
5,295,169 A * 3/1994 Tominaga et al. .......... 376/293
5,610,962 A * 3/1997 Solorzano et al. .......... 376/260
6,343,106 B1   1/2002 Hiraiwa

FOREIGN PATENT DOCUMENTS

| DE | 2144445 | * | 9/1971 |
| JP | 59-99393 | * | 6/1984 |
| JP | 2-115793 | * | 4/1990 |
| JP | 11-311693 | * | 11/1999 |
| JP | 2000-346993 | * | 12/2000 |

OTHER PUBLICATIONS

Forsberg, "Passive Emergency Cooling Systems for Boiing Water Reactors,"Nuclear Technology, vol. 76, Jan. 1987, p. 185–192.*

* cited by examiner

Primary Examiner—Michael J. Carone
Assistant Examiner—R Palabrica
(74) Attorney, Agent, or Firm—Foley & Lardner LLP

(57) ABSTRACT

The present invention provides a boiling water reactor nuclear power plant in which a reactor core support plate, upper grid plate, and a reactor core consisting of fuel assemblies supported by these plates are provided in the inner base portion of a nuclear reactor pressure vessel. Control rod guide tubes and a reactor core shroud are positioned over the upper grid plate, and a control rod drive mechanism is provided further above same, whereby the control rods can be inserted from above the reactor core, and natural circulation of cooling water inside the reactor can be achieved by means of a chimney effect of the control rod guide tubes. According to the above structure, there can be provided a compact and economical nuclear power plant.

13 Claims, 16 Drawing Sheets

BOILING WATER REACTOR NUCLEAR POWER PLANT AND ITS CONSTRUCTION METHOD

CROSS REFFERENCE TO RELOCATED APPLICATIONS

The present application is based on Japanese Application 317169/2000, filed Oct. 17, 2000, which is herein incorporated by reference in its entirety.

BACKGROUND OF THE INVENTION

1. Field of the Invention

The present invention relates to a boiling water reactor nuclear power plant with a natural circulation reactor, and particularly to a boiling water reactor nuclear power plant and its construction method with a simplified compact system configuration, having diversity to the power demand, and an improved economy and similar.

2. Description of the Related Technology

In conventional plants, as the configuration of reactor pressure vessel and internals of the boiling water reactor nuclear power plant, forced circulation method has been mainly adopted such that active pumps installed at the bottom of the reactor pressure vessel circulates reactor water, and jet pumps installed in the reactor are driven by the external loop active pumps. And as the control rod of power control means, bottom entry type which is inserted from the bottom of reactor pressure vessel has been adopted.

For the above configuration, the lower drywell space has been large in order to keep the circulating pumps and the control rod drive mechanism and its draw out space below the reactor pressure vessel. And this lower drywell is used for a large quantity of water storage space during loss of coolant accident since the suppression pool water injected into the reactor pressure vessel is drawn down to this space from the break cavity. And therefore this space has been wasteful to design the water quantity of the suppression pool.

And if core fuel is melted and dropped down onto the bottom of the reactor pressure vessel during assumed severe accident, the configuration with control rod driving mechanism and similar prevents from cooling the melted core from outside the reactor vessel.

As for the example of the conventional plant among these boiling water reactor nuclear plants, it is explained using the newest type reactor named ABWR referring to FIG. 15 as follows.

On conventional boiling water reactor nuclear power plant, core shroud 3 which contains the core 2 is installed in the reactor pressure vessel 1, many fuel bundles 6 are provided between core support plate 4 and upper lattice plate 5 which is installed in each at lower and upper portion in the core shroud.

Shroud head 7 is installed above the core shroud 3, and steam separator 9 is installed above the shroud head 7 through the standpipes 8. Steam dryer 10 is installed above the steam separator 9. Control rod guide tubes 11 of the control rod (not figured) which are inserted into the core 2 and the control rod drive mechanism 12 which drives the control rods are installed below the core support plate 4.

Plural reactor internal pumps 13 are installed in the circumferential direction at the bottom of the reactor pressure vessel 1.

Main steam pipes 14 are provided on the sidewall of the reactor pressure vessel 1 alongside the steam dryer 10 to supply reactor steam to the turbine (not shown). Feed water pipes 15 are provided on the sidewall of the reactor pressure vessel 1 alongside the standpipes 8 of steam separators to supply cooling water to this reactor 1.

In the boiling water reactor of this configuration, the coolant above the core is drawn into the internal pumps 13 from the gap area between the core shroud 3 and the reactor pressure vessel 1, and it generates steam in the core 2 through the core bottom, and it is lead to the turbine through the main steam pipes 14 via. the standpipes 8, the steam separators 9 and the steam dryer 10. The steam which works in the turbine is condensed by the main condenser, and the condensed water is returned to the reactor upper portion through the feed water pipes 15.

In these conventional type boiling water reactor nuclear power plants, the core and the pressure containment vessel is cooled during accident using active components in general, and for the severe accident means, in which these active components are assumed not to be used, passive cooling systems or alternate active cooling/injection systems have been added at present.

Therefore it requires additional exclusive passive equipments for the severe accident other than the design base accident equipments and system regardless of degree of these reliability and it has been given a large impact economically.

And as for the cooling method inside drywell during reactor normal operation, cooling heat exchanger (drywell cooler), for which cooling water is supplied from outside drywell, and fans for circulating the inner gas are installed in the drywell in general.

The conventional pressure containment vessel is made from steel or reinforced concrete. Namely, a gourd-shaped standalone type or a bell-shaped integrated building type is adopted for the steel containment vessel. And an integrated dual-cylinder type is adopted for the reinforced concrete containment vessel. The vessel sizing factors are mainly as follows; components arrangement inside drywell as for drywell, water and air space volume for the pressure suppression in the early stage of accident as for suppression pool.

In addition the pressure containment vessel strength is evaluated if its stress is below the limit in which hydrogen gas generated by metal-water reaction is stored assumed severe accident condition continuing the heat removal using passive containment cooling heat exchanger or alternate cooling/injection system.

Reactor building is made from reinforced concrete separated from turbine building, and is designed on each site conditions or plant power output. These buildings are constructed almost on site works.

FIG. 16 shows an example of the latest boiling water reactor plant under studying.

This plant is constituted of reactor building 421, pressure containment vessel 422, reactor pressure vessel 423 and its associated system and component. In this constituted plant, control rod and its driving mechanism 435 is provided below the reactor core 424, and reactor coolant circulation components like reactor internal pumps 425 are provided on the reactor vessel bottom.

Emergency core cooling system pumps 426 are located on the lowest floor of the reactor building 421, and residual heat removal pumps 427 and heat exchangers 428 for the containment vessel cooling as same manner.

On severe accident which exceeds design base accident, core and containment vessel 422 is continuously cooled using passive containment cooling heat exchanger 429 and alternate injection pumps 430 via alternate injection water supply tank 436.

During annual plant inspection, core fuels are moved to spent fuel storage pool 432 on the condition of reactor well filled with water.

PROBLEMS TO BE SOLVED BY THE PRESENT INVENTION

Although there has been previously existed the idea of forced circulation type boiling water reactor with internal type upper entry control rod drive mechanism, the concept of natural circulation type boiling water reactor with it combining raised type suppression pool has not known before.

In the case of a conventional system of bottom entry control rod and bottom located suppression pool, when gravity driven cooling system of passive safety is adopted, additional exclusive tank of gravity driven cooling system is needed on the upper elevation portion of pressure containment vessel other than suppression pool and it causes large volume of pressure containment vessel.

And bottom entry control rod mechanism causes large lower drywell volume for the flooding by gravity driven cooling system to become large pool capacity of gravity driven cooling system. Furthermore many various nozzles, piping and control rod guide tubes etc. located under the core prevents IVR (In Vessel Retention), which stops the progress this event, of the molten core at severe accident.

Meanwhile, the present inventors and others have investigated the whole reactor pressure vessel removal. But it is difficult for the conventional reactor pressure vessel since various piping below the core elevation can not be cut off with the core filled with coolant because of in vessel fuel condition.

If a natural circulation system is adopted, it requires large height chimney of two phase region to produce required circulation driving force to compensate the small driving force, and it causes large height of reactor pressure vessel. Furthermore if a high density core is adopted, it becomes unrealistic to get its required driving force on the natural circulation system since the narrow space of the two phase core region causes increased core pressure drop.

In a natural circulation reactor, there is no transient mitigation function corresponding to RPT (Re-circulation Pump Trip) of the current type boiling water reactor using forced circulation system, then ATWS (Anticipated Transient Without Scram) is more severe than forced circulation type reactor.

In the conventional boiling water reactor, there are significant economical problems of additional installation of some active and passive components to remove heat from the pressure containment vessel during a loss of coolant accident.

Moreover, assumed severe accident condition where the core fuel melts and falls down on the reactor pressure vessel bottom, then as for IVR (In Vessel Retention), the conventional boiling water reactor which has control rod guide tubes under the lower vessel mirror plate can be difficult for in vessel cooling from RPV outside wall, and as for the RPV core region gravity injection cooling from the lower drywell pool flooded by the suppression pool water it can be difficult for the sufficient cooling since the cooling water does not circulate sufficiently in the lower drywell pool and the RPV bottom wall surface is covered with the steam film generated.

Drywell coolers and their ducts in which the drywell gas is circulated are provided in the drywell, and it has severe arrangement space and needs to locate active components in it.

FIGS. 17 and 18 show examples of other conventional plant.

FIG. 17 shows the plant of raised suppression pool 433 type. FIG. 18 shows the plant of bottom located suppression pool 433 type.

In these plants active components such as pumps and fans are located in the relatively high radiation area of the drywell 434. During plant inspection maintenance workers have to enter in this area for the maintenance work, and this causes to increase their radiation exposure.

Furthermore when reactor pressure vessel 423 of approximately 20 m high, which is used forced circulation reactors, is applied for the raised suppression pool type pressure containment vessel 422, since main steam piping is arranged to the turbine through under the suppression pool 433 from upper portion of the reactor pressure vessel 423, it causes the increased piping material and drywell space to lead economic disadvantages Since the building of a conventional boiling water reactor is generally constituted in respective building because of the different seismic design conditions of the components located in the reactor building and turbine building, it requires seismic and construction design respectively and it has an economical disadvantage for the increased floor space.

Furthermore since the design criteria (specification, seismic condition, etc.) for the reactor building is different in each construction site, it has been difficult for the design standardization. Moreover there has been problems of large increased works and period of the reactor building construction.

SUMMARY OF THE INVENTION

The present invention had been achieved for resolving the problems of the conventional technology, and the first target is to provide a compact and economic nuclear power plant.

The second target is to provide the volume reduced pressure containment vessel by maintaining the make up water in the suppression pool even if adopting the gravity driven cooling system of passive safety.

The third target is to minimize the lower drywell volume eliminating all the obstacles of nozzle and piping under the reactor pressure vessel, and the required pool volume to be injected by the gravity driven cooling system, so that IVR (In Vessel Retention of the molten core) can be easily carried out, on which the event progress is prevented in the reactor pressure vessel on severe accident.

The fourth target is to control the plant power to be suppressed in the ATWS (Anticipated Transient Without Scram) event until the boric acid solution injection system is initiated for the reactor shutdown.

The fifth target is to provide compact, simple and passive (natural force used) heat removal system from the containment vessel on a loss of coolant accident etc. to have high reliability and economical advantage.

The sixth target is to enable to cool the reactor pressure vessel wall on keeping the molten core in it through heat release outside the pressure containment vessel in case of core melt condition on severe accident to minimize the influence of severe accident for improving safety.

The seventh target is to provide maintenance free design and reduced required volume space in the drywell with no active component required.

The eighth target is to ensure that the molten core is isolated and kept cooling in the pressure containment vessel without active components in case of the core melted down and abnormal plant condition is reliably detected.

The ninth target is to enable the released heat in the drywell during accident to be transferred to the suppression pool without using active components, and to enable the event to be terminated without water flooding the lower drywell. And thereby the plant reliability can be improved.

The tenth target is to eliminate the required operator entrance in the drywell for the maintenance of valves etc. to reduce the radiation exposure.

The eleventh target is to standardize the seismic and the building design, and to significantly reduce the construction period to get economical advantage.

MEANS FOR RESOLVING THE PLOBLEMS

In order to achieve these targets, there may be provided a boiling water reactor nuclear power plant comprising: a reactor building; a pressure containment vessel positioned in the reactor building; a drywell comprising a space inside the pressure containment vessel; a pressure suppression pool provided inside the pressure containment vessel; a nuclear reactor pressure vessel contained by the pressure containment vessel; a reactor core having fuel assemblies supported by a reactor core support plate and an upper grid plate provided in an inner base portion of the nuclear reactor pressure vessel; a reactor core shroud surrounding the reactor core and the upper grid plate; control rod guide tubes positioned in the reactor core shroud and over the upper grid plate; control rods inserted in the control rod guide tubes; and control rod drive mechanisms which drive the insertion and withdrawal of the control rods from above the reactor core, the control rod drive mechanisms being provided above the control rod guide tubes and inside the reactor core shroud.

According to this invention, the core fuel is located at the RPV bottom portion and the control rod guide tubes are located above the core, and therefore the chimney effect provides strong natural circulation driving force to get maximum performance of the natural circulation reactor. Moreover this configuration is very compact and has economical advantage without re-circulation pumps.

In the boiling water reactor there may be provided a boiling water reactor characterized in that the pressure suppression pool is positioned higher than said reactor core, said pressure suppression pool being connected to said nuclear reactor pressure vessel by means of gravity-based piping through which the cooling water drops by gravity.

According to this invention, if gravity driven core cooling system as a passive safety system is adopted, then the water source of the gravity driven core cooling system is stored in the suppression pool, and hence pressure containment vessel volume can be reduced in compact.

In the boiling water reactor nuclear power plant there may be provided a boiling water reactor nuclear power plant characterized in that a piping and nozzles connected to the nuclear reactor pressure vessel are located above the reactor core.

According to this invention, since all obstacles such as nozzles, pipes or the like can be eliminated from the area below the nuclear reactor pressure vessel, the volume of the lower dry well can be minimized, so that it is possible to minimize the pool volume that is to be filled by the gravity driven core cooling system, and retention of the molten core material inside the nuclear reactor pressure vessel in order to prevent an event (severe accident) from progressing, can be performed readily as a severe accident situation countermeasure.

In the boiling water reactor nuclear power plant there may be provided a boiling water reactor nuclear power plant characterized in that a valve which can be optionally opened to an exterior of the core shroud is provided at a position above the fuel assembly.

According to this invention, a nuclear reactor pressure vessel internal valve which can be opened optionally to the outside the core shroud is provided in a location of the required height of the chimney portion, for example, in the shroud head above the fuel, and by opening this valve in the event of ATWS (Anticipated Transient Without Scram), a flow rate of the natural circulation can be reduced, so that the plant power can be suppressed until the boric acid solution injection system for shutting down the nuclear reactor is initiated.

In the boiling water reactor nuclear power plant there may be provided a boiling water reactor nuclear power plant characterized in that the walls of the pressure containment vessel are made from multiple steel plates having ribs, which are mutually opposing in a separated fashion, so that cooling means is formed by using the spaces between these multiple steel plates as water flowing passage or air flowing passage.

According to this invention, by constituting the walls of the nuclear reactor containment vessel by a ship hull type dual-steel-plate structure, and providing spaces in these dual-steel-plate walls which can be used for cooling the nuclear reactor containment vessel, then it becomes possible to cool the nuclear reactor containment vessel by only natural forces using the water or air passing through these spaces.

In the boiling water reactor nuclear power plant there may be provided a boiling water reactor nuclear power plant characterized in that the pressure suppression pool and the lower portion of the dry well are connected by means of a plurality of emergency piping, the piping being disposed at different positions in elevation level.

According to this invention, two coupling pipes (two communication pipes), for example, an upper and lower coupling pipe, are provided between the pressure suppression pool and the lower portion of the dry well, for causing natural circulation of pool water between the pool and the dry well, whereby, after flooding the lower portion of the dry well in the event of an accident, the heat released to the dry well is transferred to the pressure suppression pool by the natural circulating convection of the pool water, so that the heat can be effectively removed from inside the nuclear reactor containment vessel in an efficient manner.

In the boiling water reactor nuclear power plant there may be provided a boiling water reactor nuclear power plant characterized in that a normal use cooling system is connected to the space regions formed between the multiple steel plates.

According to this invention, by filling the spaces in the dual-steel-plate sections with water and connecting to the normal use cooling water system, it becomes possible to cool the inside the dry well during normal operation of the plant.

In the boiling water reactor nuclear power plant there may be provided a boiling water reactor nuclear power plant characterized in that a normally closed water drain pipe (discharge pipe) is led from the pressure suppression pool into the dry well at the base region of the nuclear reactor pressure vessel, the drain pipe is normally closed by a sealing device while the sealing device for this water drain pipe can be opened or released by heat sensing means in case of an emergency so as to open the water drain pipe.

According to this invention, even if a reactor core meltdown occurs, it is possible to cool and separate the molten material without needing to provide active components inside the containment vessel, and furthermore, any abnormal conditions can be detected reliably.

Moreover, in this invention, in addition to connecting the dry well space at the base of the nuclear reactor pressure vessel with the pressure suppression pool by means of piping, it is also preferable to seal the opening of the piping outlet of this pipe to the dry well space by means of a low-melting-point alloy such as Ag brazing material, solder or the like, and to provide a differential pressure meter in such a manner that the pressure differential in the piping can be measured.

In the boiling water reactor nuclear power plant there may be provided a boiling water reactor nuclear power plant characterized in that a heat pipe capable of exchanging heat is provided at a portion between the pressure suppression pool and the lower region of the dry well.

According to this invention, by connecting the dry well space at the base of the nuclear reactor pressure vessel to the pressure suppression pool by means of the heat pipe, heat released into the dry well in the event of an accident can be transferred to the pressure suppression pool by the natural circulation convection of the heat pipe, and hence the heat inside the nuclear reactor containment vessel can be effectively removed in an efficient manner.

In the boiling water reactor nuclear power plant there may be provided a boiling water reactor nuclear power plant characterized in that the nuclear reactor containment vessel is formed as a dual-cylinder structure wherein the dry well and the pressure suppression pool is positioned on the outer side of the dry well, in addition to which a guard pipe extending from the dry well section to the pressure suppression pool is provided, and piping and valves led from the nuclear reactor pressure vessel are accommodated inside this guard pipe.

According to this invention, since the nuclear reactor containment vessel has a dual-cylinder structure wherein the dry well is disposed on the inner side and the pressure suppression pool is disposed on the outer side thereof, and a nuclear reactor system is adopted wherein the active components positioned inside the dry well are kept to a minimum, the pipes such as the main steam pipe led form the nuclear reactor pressure vessel and the nuclear reactor containment vessel inside located valves or the like are accommodated inside the guard pipe extending from the dry well section of the dual-cylinder structure to the exterior thereof, thereby enabling required maintenance of valves or the like, to be performed inside the guard pipe.

In the boiling water type nuclear power plant a boiling there may be provided water type nuclear power plant characterized in that turbine system is located at an upper portion of the nuclear reactor building.

According to the present invention, the spent fuel pool and its associated peripheral apparatus are eliminated, and the turbine system or the like is located at the upper portion of the nuclear reactor building, thereby permitting the whole plant apparatus to be housed in a single module building.

In the boiling water reactor nuclear power plant there may be provided a boiling water reactor nuclear power plant characterized in that a removing space for accommodating the nuclear reactor pressure vessel is provided above the nuclear reactor pressure vessel in the nuclear reactor building.

According to this invention, the removing space is provided above the nuclear reactor pressure vessel, whereby the nuclear reactor pressure vessel including the dry well cylinder section can be exchanged in an integral way.

In the boiling water reactor nuclear power plant there may be provided a boiling water reactor nuclear power plant characterized in that the nuclear reactor building is located on a foundation having a seismic structure.

According to this invention, by locating the integrated nuclear reactor building module on a foundation having a seismic structure, it becomes possible to achieve standardized design of the building and the components and apparatus.

The invention provides a method for constructing a boiling water reactor nuclear power plant characterized in that the boiling water reactor nuclear power plant may be previously fabricated in a factory as building modules, then the modules are transported to a construction site, and only the required number of modules are installed so as to construct entire plant.

According to this invention, when the integrated building modules are fabricated in a factory, then transported to the construction site, and the plant output power can be selected as desired level by only installing the required number of modules at the construction site.

DESCRIPTION OF THE PREFERRED EMBODIMENTS

Next, preferred embodiments of a boiling water reactor nuclear power plant according to the present invention will be described hereunder with reference to FIG. 1 to FIG. 14.

Figure 1:
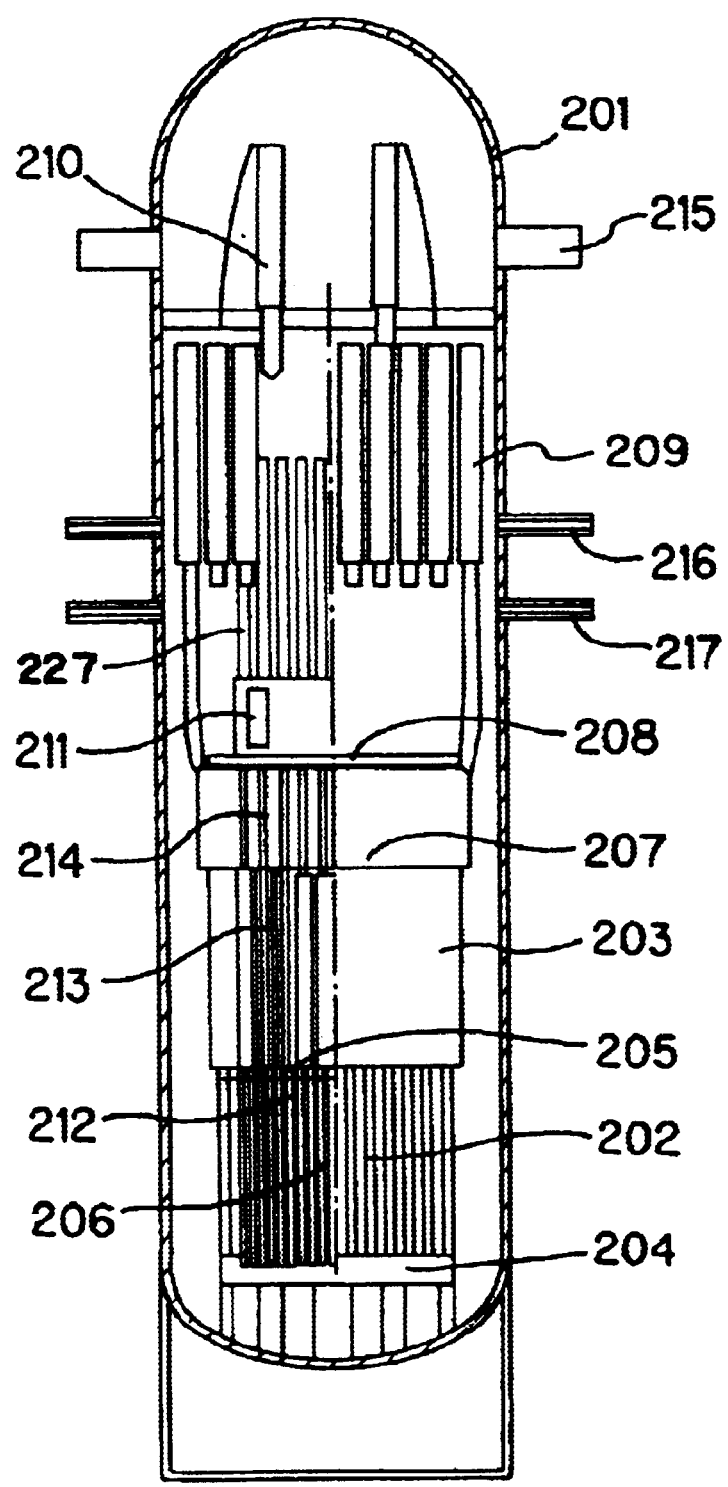
FIG. 1 is an approximate sectional view showing the composition of a nuclear reactor in a boiling water type nuclear power plant according to one embodiment of the present invention.

FIG. 1 is a cross sectional view showing the general composition of a nuclear reactor pressure vessel. As illustrated in FIG. 1, in the present embodiment, a reactor core 202 is provided in the bottom of the nuclear reactor pressure vessel 201. More specifically, a reactor core support plate 204 is provided in the vicinity of a base portion of the nuclear reactor pressure vessel 201, a plurality of fuel assemblies 206 are supported on the reactor core support plate 204 standing in a square lattice configuration, and the top of the fuel assemblies 206 are fixed by an upper grid plate 205, whereby a reactor core 202 is constituted.

The control rods 212 are cross-shaped control rods which are regularly disposed for each group of four fuel assemblies 206, and which are inserted into the reactor core 202 from above, by means of an internal control rod drive mechanism 211 accommodated entirely in the nuclear reactor pressure vessel 201.

More specifically, a reactor core shroud 203 is provided on top of the upper grid plate 205 and control rod guide tubes 213 are disposed in this reactor core shroud 203. A control rod drive mechanism support grid 208 is fixed on the shroud head 207 of the reactor core shroud 203, and the control rod drive mechanism 211 is provided on this control rod drive mechanism support grid 208.

The control rod drive mechanism 211 has, for example, a ball screw structure, the control rods 212 being connected to this control rod drive mechanism 211 by means of control rod drive shafts 214, the control rod being possible for going up and down. Thereby, the control rods 212 are inserted from above into the reactor core 202 by passing through the control rod guide tubes 213.

In the present embodiment, all of the control rod guide tubes 213 are connected integrally, thereby to form a structure having a honeycomb-shaped lateral cross-section comprising a bundle of multiple tubes. The gap space adjacent to the control rod guide tubes 213 is open in the vertical direction, in such a manner that the two-phase gas/liquid flow generated in the reactor core 202 rises up via a two-phase flow region constituted by the gap space adjacent to the control rod guide tubes 213.

A steam-water separator 209 is provided above the control rod drive mechanism 211 in the nuclear reactor pressure vessel 201, and furthermore a steam dryer 210 is provided above the steam-water separator 209. A withdrawal space 227 for withdrawing and removing the control rods is provided below the steam dryer 210.

Moreover, a main steam pipe 215, feed water pipe 216 and emergency core cooling pipe 217 are provided respectively above the reactor core 202 of the nuclear reactor pressure vessel 201, and no piping, valves, drive mechanisms, or the like are provided below the reactor core 202.

In this nuclear reactor pressure vessel 201, during plant operation, the two-phase flow generated in the reactor core 201 rises up via the gap space adjacent to the control rod guide tubes 213, and the steam passes through the steam-water separator 209 and steam dryer 210, and is sended via the main steam pipe 215. While, the separated water drops back down along the internal walls of the nuclear reactor pressure vessel 201, through either the steam-water separator 209 or steam dryer 210, and hence goes back on natural circulation to the reactor core 202.

Figure 6:
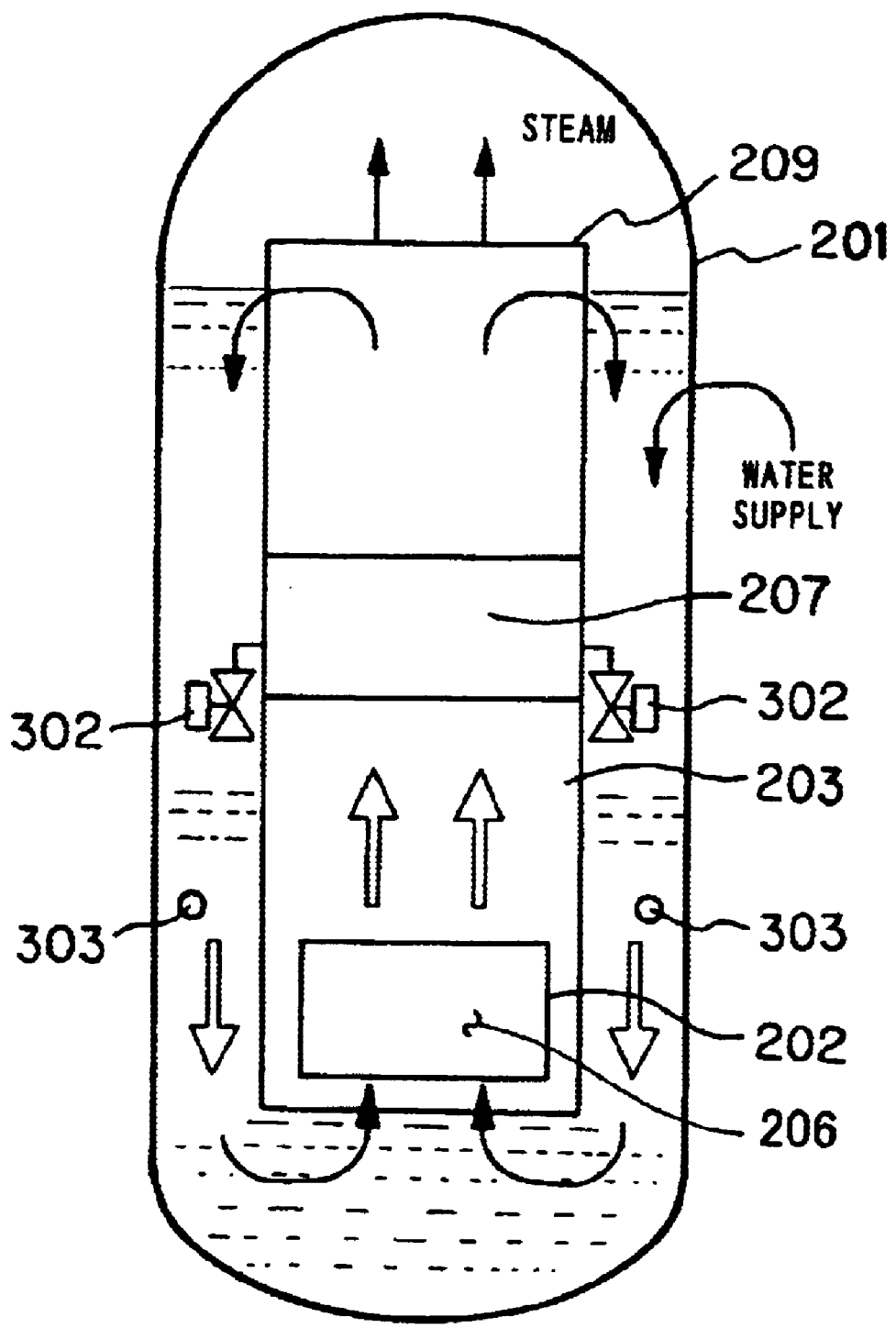
FIG. 6 is a diagram showing the state of flow of a reactor core cooling water when a valve is closed, according to one embodiment of the present invention.

Therefore, according to the present embodiment, since the reactor core 202 is placed in a bottom position in the nuclear reactor pressure vessel 201 and the control rod guide tubes 213 are disposed thereabove, a chimney effect is created. The chimney effect enhances thermally driven natural circulation flow of water heated in the core 202 up into the region containing the control rod guide tubes 213 where the water cools and sinks to the bottom of the reactor vessel for reentry into the core 202 as illustrated in FIG. 6. Thus, the chimney effect increases the natural circulation flow rate that can be obtained. Hence, the characteristic features of the natural circulation type reactor can be utilized to the maximum. Furthermore, since it is not necessary to provide re-circulation pumps, as in a conventional nuclear reactor pressure vessel, the composition of the nuclear reactor pressure vessel can be made very compact, and significant economic benefits can be obtained by associated cost reductions.

Figure 2:
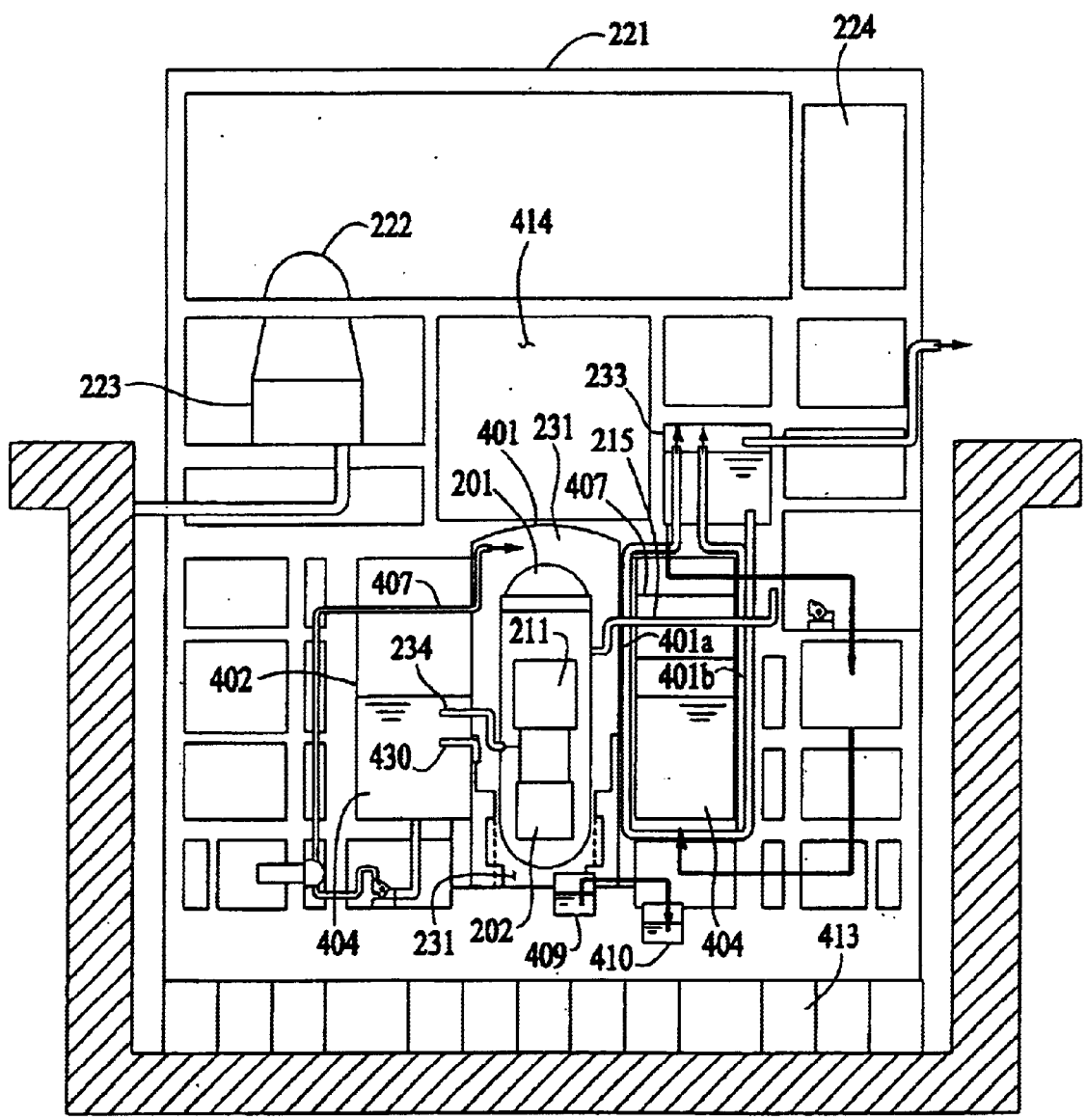
FIG. 2 is a sectional view showing a composition of a nuclear reactor building according to one embodiment of the present invention.

FIG. 2 is a general sectional view showing a composition of a nuclear reactor building for accommodating the nuclear reactor pressure vessel 201.

This nuclear reactor building 221 has a unified structure comprising an underground level and an overground level, which is installed on underground foundations via whole anti-seismic devices 413 for suppressing vibration in the vertical direction and lateral direction, and a pressure containment vessel 401 is disposed in the central region of the underground level.

Furthermore, in the overground level of the nuclear reactor building 221, there are provided a turbine 222 and a main condenser 223, along with a main control room, air conditioning component room 224, and the like. Moreover, there is also provided a removal space 414 having a sufficient volume to permit the nuclear reactor pressure vessel 201 to be lifted up to the central region of the overground level, thereby forming a composition wherein the whole nuclear reactor pressure vessel 201 can be lifted out upwards in one piece, as described hereinafter, thereby permitting exchange of the whole nuclear reactor pressure vessel unit.

The pressure containment vessel 401 has a dual-cylinder structure comprising an inner wall 401a for forming a dry well 231 about the outer circumference of the nuclear reactor pressure vessel 201, and an outer wall 401b for forming a pressure suppression pool 404 to the outer side of the inner wall. The walls of this pressure containment vessel are constituted by a plurality of, for example, two, three or more, steel plates which are mutually opposing in separated fashion, the spaces between the opposing steel plates being able to convey water or air. These steel plates are formed with ribs which project vertically, laterally, or both vertically and laterally, on the opposing faces of the steel plates.

Furthermore, the pumps, fans, and the like, which are active devices installed inside the pressure containment vessel 401 are to be minimized, and the piping such as the main steam pipe 215 led from the nuclear reactor pressure vessel 201, and the valves, and the like, provided inside the pressure containment vessel are accommodated inside a guard pipe 407 having a closed front end, which extending from a portion of the dry well 231 to the outside.

Furthermore, the active devices disposed inside the dry well 231 may be minimized by using a control rod drive system that comprises upper entry type control rod drive mechanisms 211 which are built into the nuclear reactor pressure vessel 201, thereby removing control rod drive system structure from the dry well. This embodiment also features control rod drive mechanism 211 designed to low-maintenance specifications and control rods and fuel assemblies 206 designed to be used up over long-term operations (for example, 20 years or more).

The cooling water in the nuclear reactor pressure vessel 201 is circulated on natural circulation driving force, wherein active pumps such as internal pumps and the like are eliminated. Internal reactor instrumentation and the like is inserted from above the nuclear reactor pressure vessel 201.

Two isolation valves for the pressure containment vessel 401 are provided, as far as possible to the outer side of the pressure containment vessel 401. A dry well sump 409 is provided in the lower portion of the dry well 231, and reactor sump 410 is provided in a position further below the dry well sump 409. Consequently, drainage from the dry well sump 409 is able to transfer by the gravity force to the lower positioned reactor sump 410. Therefore, no active pumps such as sump pumps are provided inside the dry well 231.

Two isolation valves for the pressure containment vessel 401 are provided outer side of the pressure containment vessel 401. A dry well sump 409 is provided in the lower portion of the dry well 231, and reactor sump 410 is provided in a position further below the dry well sump 409. Consequently, drainage from the dry well sump 409 is able to transfer by the force of gravity to the lower positioned reactor sump 410. Therefore, no active pumps such as sump pumps are provided inside the dry well 231.

In this way, by integrating buildings that would otherwise have different seismic grades, such as a reactor building 221 and a turbine building or the like, into one building, the seismic design and construction design for the buildings can be performed together in one process, and turbines 222 and the piping or the like can be arranged together with this reactor building 221, in an integral way, on a foundation having an anti-seismic structure. Thereby, it is possible to achieve design standardization and rationalization.

Figure 10A:
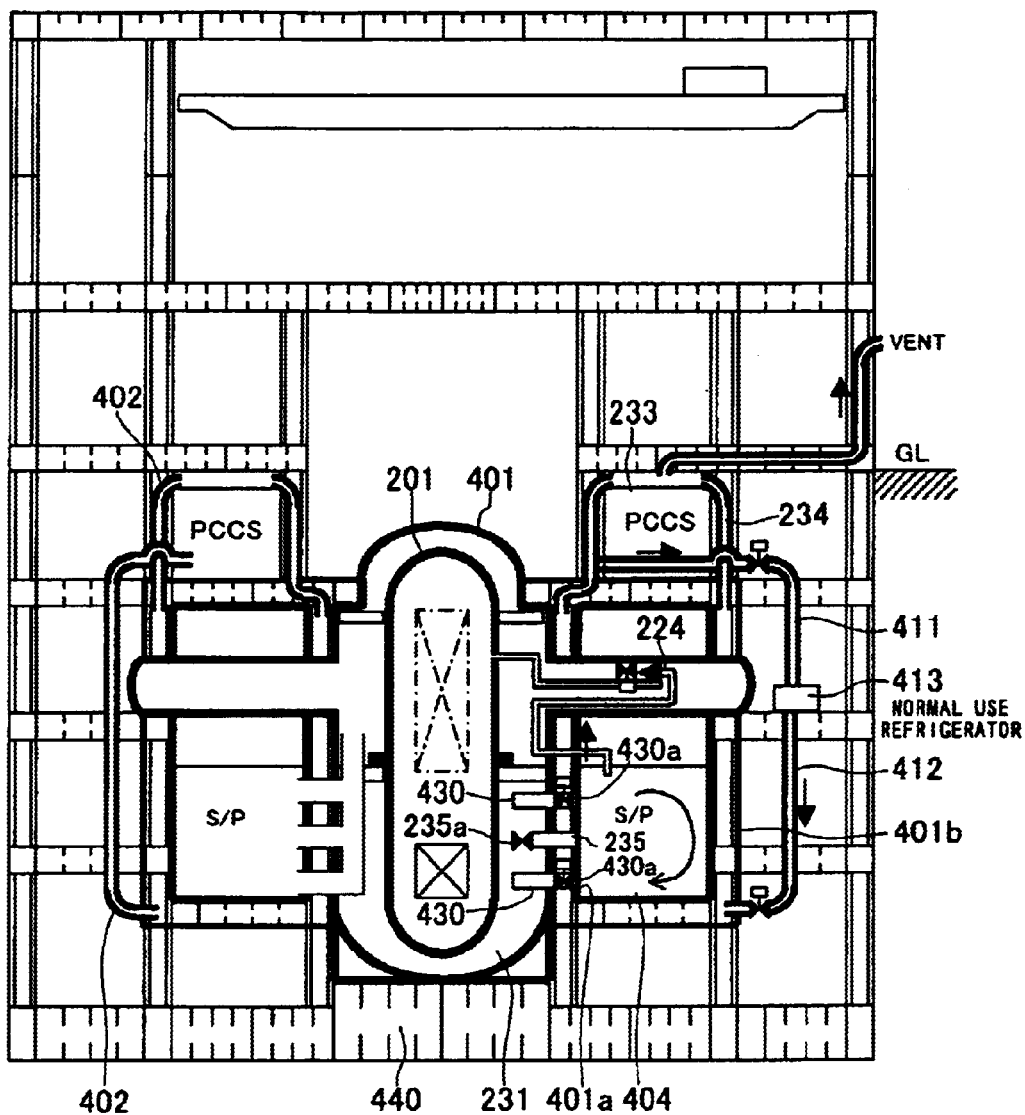
FIG. 10(A) is an explanatory view showing the cooling operation according to one embodiment of the present invention.
Figure 11:
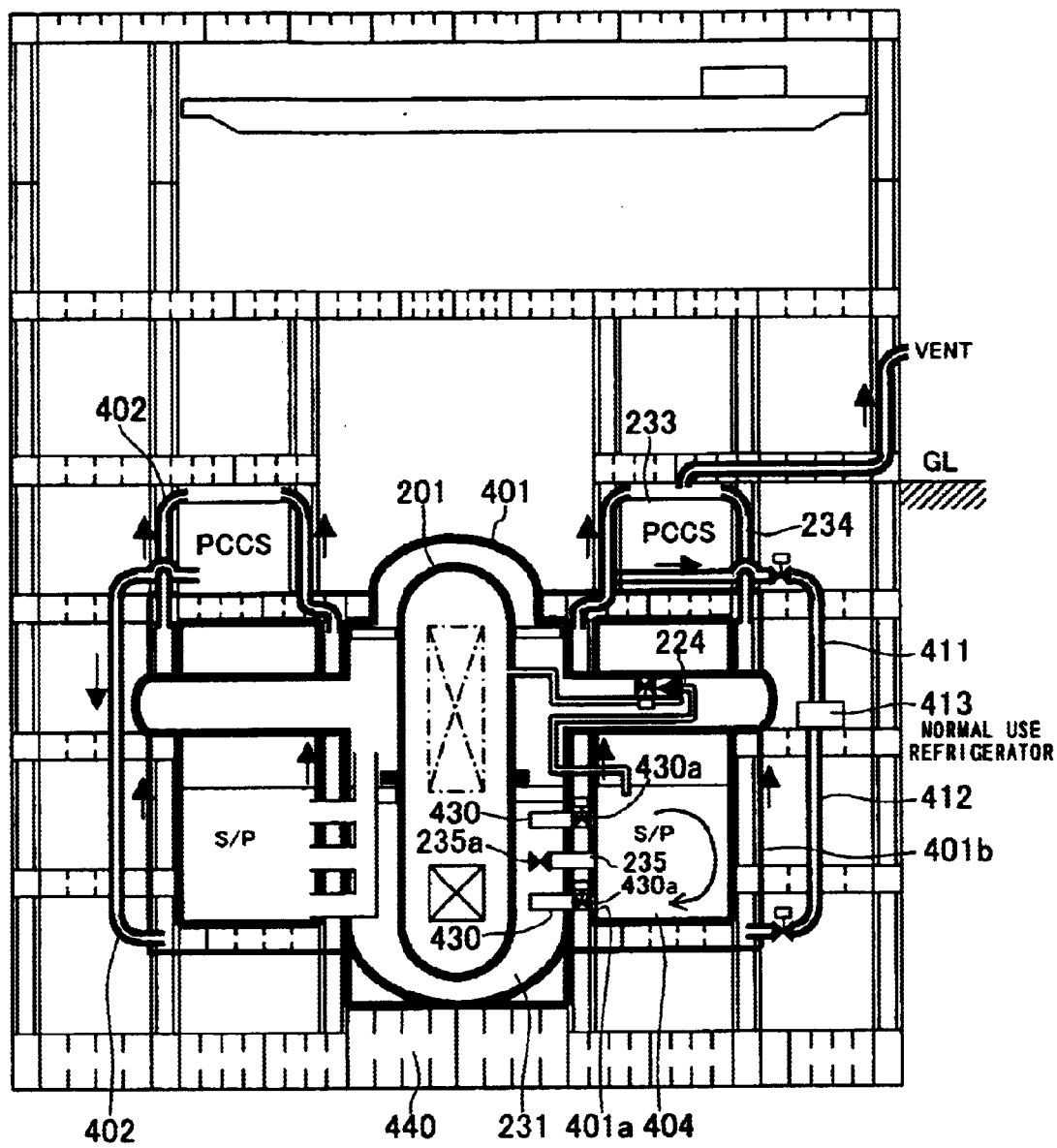
FIG. 11 is a diagram describing another cooling operation according to one embodiment of the present invention.

As described above and illustrated in the figures, the pressure containment vessel 401 has a dual-cylinder structure formed by an inner wall and an outer wall. As shown in FIGS. 2, 10A and 11, the pressure containment vessel 401 comprises a dry well 231 provided on the inner side of the inner wall and a pressure suppression pool 404 provided in a portion of the volume between the inner wall and the outer wall. As shown in FIG. 2, most of the pressure suppression pool 404 volume is disposed above the reactor core 202 constituted by the fuel assemblies 206. A dry well flooding pipe 430 for injecting water from the pool into the dry well 231 under its own gravity in the case of an emergency, and a gravitational reactor core cooling water injection system pipe 234 for injecting water into the reactor core 202 are connected to the pressure suppression pool 404. Thereby, the pressure suppression pool 404 has a composition whereby the pool water contained therein also serves as a water source for a gravity driven core cooling system.

Supposing, for example, that a loss of coolant accident (LOCA) has occurred, then the gravity driven core cooling system pipe 234 injects water from the pressure suppression pool 404 into the reactor pressure vessel 201 via a check valve and shut-off valve (shown in FIG. 3 connected to pipe 234), and the reactor core 202 is cooled by flooding, in such a manner that a more severe accident can be prevented from occurring.

Therefore, the boiling water reactor nuclear power plant according to the present embodiment is a nuclear power plant which is able to provide a greater safety sense to the local population and the plant operators, compared with a conventional boiling water reactor nuclear reactor, without having to consider countermeasures against falling of molten core material or steam explosions, as measures against so-called severe accidents, nor needing to assume about the generation of a large quantity of hydrogen or the like due to a water/zirconium reaction or the like.

Figure 4:
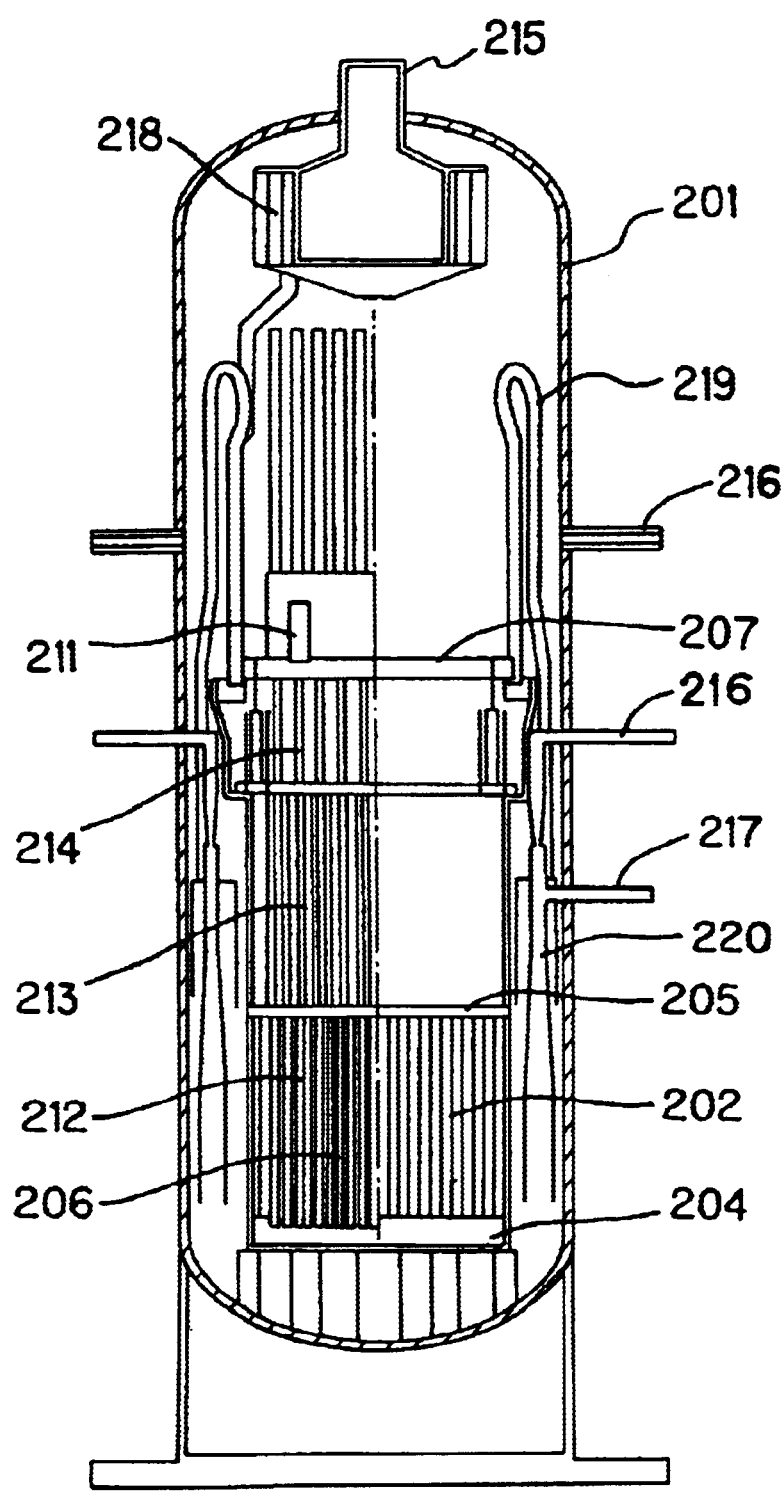
FIG. 4 is an approximate sectional view showing a modification example of a nuclear reactor pressure vessel according to one embodiment of the present invention.

Furthermore, as shown in FIG. 4, the present embodiment facilitates meeting government-imposed requirements concerning severe accident countermeasures by having no nozzles, penetrations, or the like, for making piping connections below the elevation of the reactor core 202 in the nuclear reactor pressure vessel 201. The main 4 pipes connected to the nuclear reactor pressure vessel 201 only comprise, as described above, the main steam pipe 215, the feed water supply pipe 216, and the emergency core cooling system pipe 217, which are located above the reactor core 202.

Moreover, by adopting the internal control rod drive mechanism 211 and a natural circulation system, there is no need to provide multiple nozzles for installing a control rod drive mechanism situated below the nuclear reactor vessel, or nozzles to be passed by the main shafts of the internal pumps, as in a conventional boiling water reactor nuclear reactor.

Therefore, it is possible to minimize the spatial volume of the lower portion of the dry well 231 surrounding the nuclear reactor pressure vessel 201, and since water can more rapidly fill this small space at a given flow rate, it is possible to achieve a structure which permits IVR (In-Vessel Retention) as a severe accident countermeasure. Namely, the retention of molten core material inside the nuclear reactor pressure vessel can be attained by rapidly flooding the dry well 231, thereby cooling the nuclear reactor pressure vessel 201 before fuel melt-through can begin and preventing the event from progressing. Thus, minimizing the spatial volume of the lower part of the dry well 231 permits it to be filled with water faster for a given flow rate. Moreover, by supplying the water to the dry well 231 rapidly, even greater safety margins can be obtained.

In the boiling water reactor nuclear power plant according to the present embodiment, the piping nozzles used for all of the reactor internal instrumentation which measures the reactor output power, reactor water level and the like, are disposed above the elevation of the reactor core 202 where the fuel assemblies 206 are loaded. Therefore, it is simple to achieve a structure wherein no nozzles, or the like, are disposed below the elevation of the reactor core 202 in the nuclear reactor pressure vessel 201.

Consequently, the nuclear reactor pressure vessel 201 can readily be removed upwards in one piece, and even when the instrumentation pipes are disconnected in order to lift out the nuclear reactor pressure vessel 201, there is no leak of reactor water, and furthermore, the nuclear reactor pressure vessel 201 can be removed in one piece whilst the fuel remains in the reactor.

Figure 3:
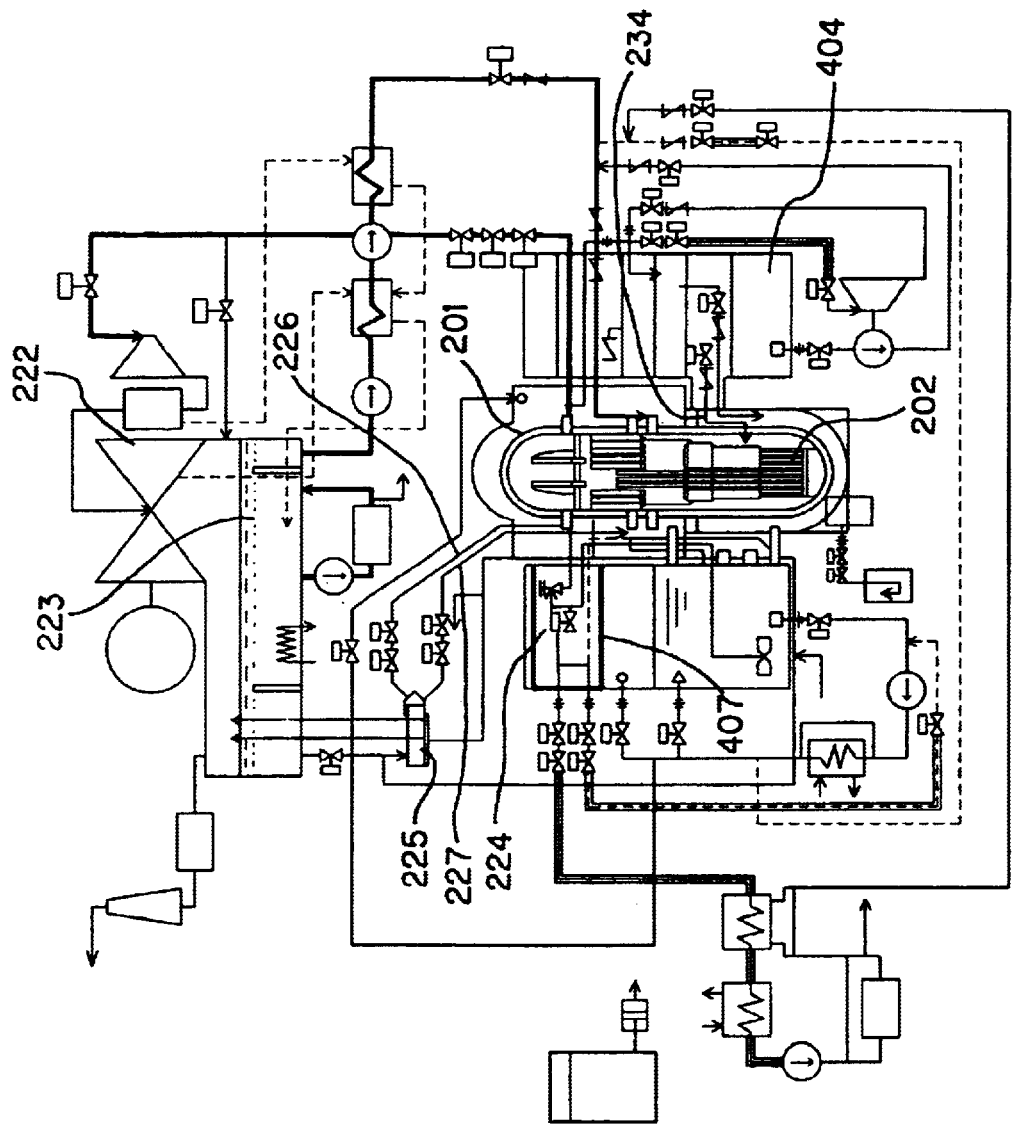
FIG. 3 is a diagram showing a nuclear reactor and turbine system according to one embodiment of the present invention.

FIG. 3 shows the system composition of a nuclear power plant according to the present embodiment.

As illustrated in FIG. 3, in addition to providing a depressurization valve 224 inside a guard pipe 407 as part of an emergency core cooling system, the aforementioned gravity driven core cooling water injection system pipe 234 is also provided, so that the reactor core can be flooded in water rapidly by gravity driven water of the pressure suppression pool, thereby ensuring safety.

Moreover, an emergency condenser 225 is also provided. Steam from the nuclear reactor pressure vessel 201 is introduced into this emergency condenser 225 via an emergency condenser steam pipe 226, and is condensed in the emergency condenser 225. The resulting condensate is returned to the reactor core 202 via the emergency condensed water pipe 227. Thereby, in cases where it is necessary to shut down the nuclear reactor in a safe manner, for instance, in transient condition in the nuclear reactor or the like, it is possible to shut down the nuclear reactor at high-temperature in an isolated condition (i.e., with the nuclear reactor isolated from the turbine and the main condenser).

FIG. 4 shows a modification example of the nuclear reactor pressure vessel 201.

In the embodiment shown in FIG. 4, in addition to natural circulation as a recirculation system for the cooling water inside the nuclear reactor pressure vessel 201, the natural circulation of the cooling water can be enhanced and the nuclear reactor output can be controlled, through a combination of a centrifugal type steam-water separator 219 bent into an inverse U-shape, and jet pumps 220 driven by the feed water from a feed water supply pipe 216.

More specifically, the centrifugal type steam-water separator 219 comprises a space on the inlet side of the reactor core that is partitioned from the nuclear reactor pressure dome (region forming water surface) which leads up via a pipe from the shroud head 207 and separates steam and water by means of the centrifugal force of an inverse U-shaped section that is opened to the inner side. The separated steam passes into an upper dome, while the remaining water is recirculated by a receiving side receiving nozzle. The water is then collected to be pressurized by a downstream diffuser, and descends via a pipe, whilst at the same time being connected in parallel to a jet pump output region driven by the feed water, provided in order to collect the feed water and the water not yet collected by the centrifugal steam separator device.

A reference numeral 217 denotes an emergency reactor core cooling system pipe, which is located above the reactor core 202. Furthermore, in this example, the steam dryer is a cylindrical-type steam dryer 218, and a main steam pipe 215 connected to this cylindrical stream dryer 218 leads from the upper end portion of the nuclear reactor pressure vessel 201. The remaining composition is approximately the same as that illustrated in FIG. 1.

By using centrifugal steam-water separator 219, the driving force of the cooling water circulation in the reactor is increased, and a high density disposed core can be also adopted, thereby enabling the height of the nuclear reactor pressure vessel 201 to be reduced to approximately the same height as a conventional forced circulation type reactor.

Figure 5:
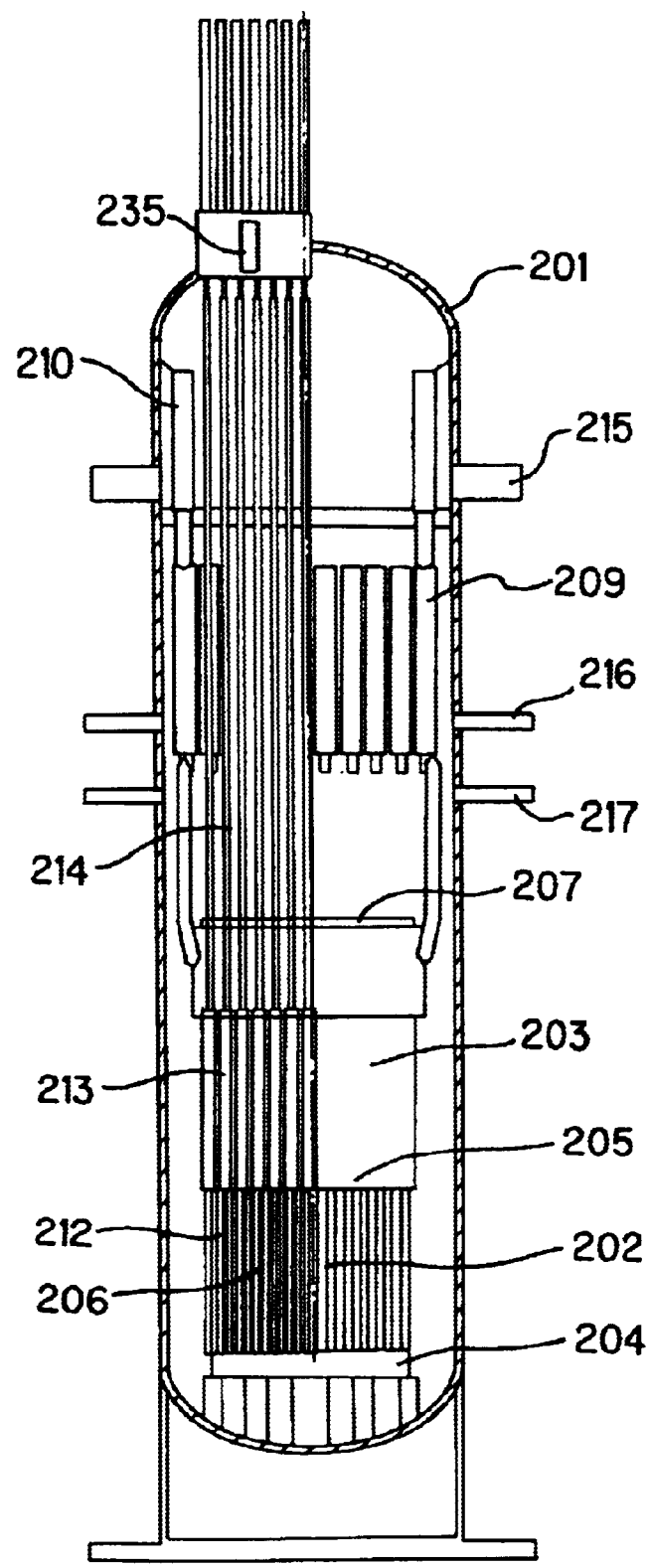
FIG. 5 is an approximate sectional view showing a further modification example of a nuclear reactor pressure vessel according to one embodiment of the present invention.

FIG. 5 shows a further modification of the nuclear reactor pressure vessel 201.

In this example, in place of the internal control rod drive mechanism 211 illustrated in FIG. 1, an external control rod drive mechanism 235 as commonly used in a pressurized water reactors is adopted as a drive system for the upper entry control rod 212. In this case, since the control rod drive shafts 214 must penetrate the steam dome and upper border at the top of the nuclear reactor pressure vessel, the stream dryer 210 is accordingly formed in a cylindrical fashion along the side walls of the nuclear reactor pressure vessel 201. The remaining composition is approximately the same as that illustrated in FIG. 1.

By adopting the external control rod drive mechanism 235 of this kind, it is possible easily to implement the present plant concept.

FIG. 6 to FIG. 9 illustrate the valve mechanisms provided inside the nuclear reactor pressure vessel 201, and the action thereof. In this embodiment, a valve which can be opened as desired from the inner side of the reactor core shroud 203 to the outer side thereof is provided in a position above the fuel assemblies 206 constituting the reactor core 202.

More specifically, as illustrated in FIG. 6, a flow path such as a pipe or the like is provided so as to penetrate from the inside to the outside of the shroud head 207, for instance, above the reactor core 202. An optionally openable nuclear reactor pressure vessel internal valve 302 is installed on the downcomer section 303 of this flow path.

Figure 8:
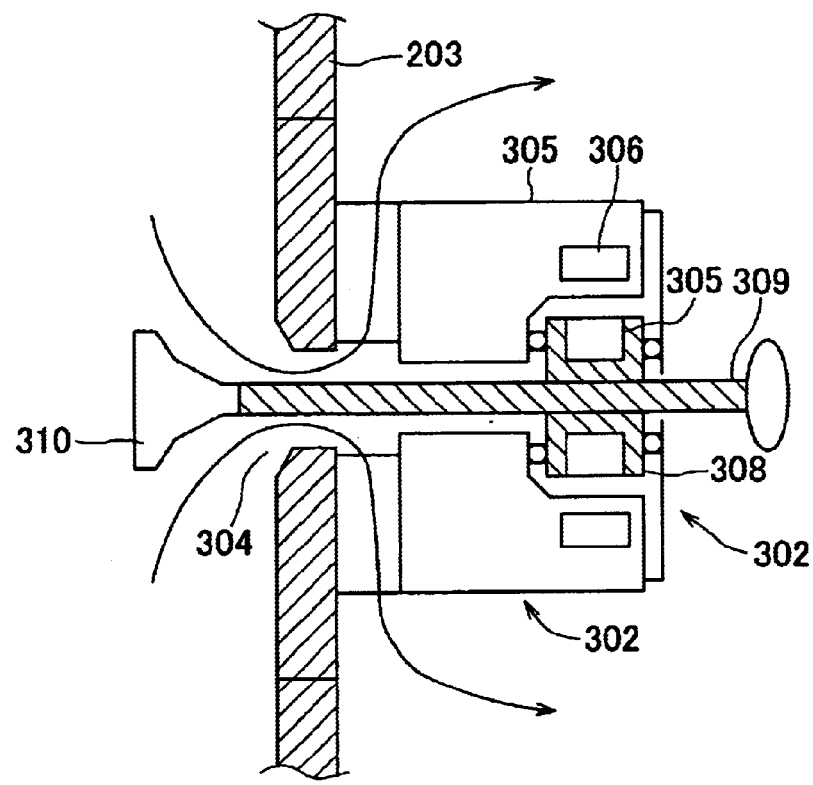
FIG. 8 is an explanatory diagram showing the composition of a valve for adjusting the circulation amount of cooling water according to one embodiment of the present invention.
Figure 9:
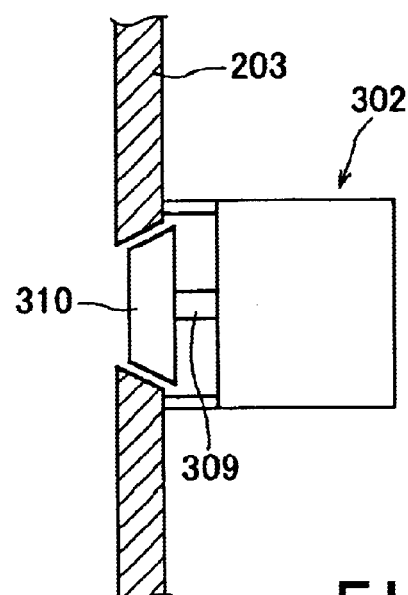
FIG. 9 is an explanatory diagram showing a composition of another valve according to one embodiment of the present invention.

Thereby, it is possible to cause cooling water to flow from the inside to the outside by a pressure difference during its passage through the reactor core shroud 203, without obtaining a chimney effect. The composition of the nuclear reactor pressure vessel internal valve 302 and its installation position and the like are not particularly limited to the composition and positions illustrated in FIG. 6, and these may be changed or applied variously as illustrated in FIG. 8 and FIG. 9 described hereinafter. In other words, the valve installation positions may be selected freely, provided that these positions are at the chimney elevation required to reduce the flow rate in the reactor core.

In a composition of RPV of this kind, during normal plant operation, the nuclear reactor pressure vessel internal valves 302 are closed, and the valve flow path is in a shut-off state. The flow path can then be opened to the required degree, as desired, according to requirements. For example, during the normal plant operation, the cooling water is circulated by passing along a natural circulation path inside the nuclear reactor pressure vessel 201, as illustrated by the arrows in FIG. 6. When the distance from the outlet of the reactor core 202 to the steam separator 209 is increased, (in other words, by lengthening the chimney section), the pressure of the water head in the downcomer section 303 (density×gravity acceleration×height) is increased, and hence the driving force causing the cooling water to circulate is also raised.

Figure 7:
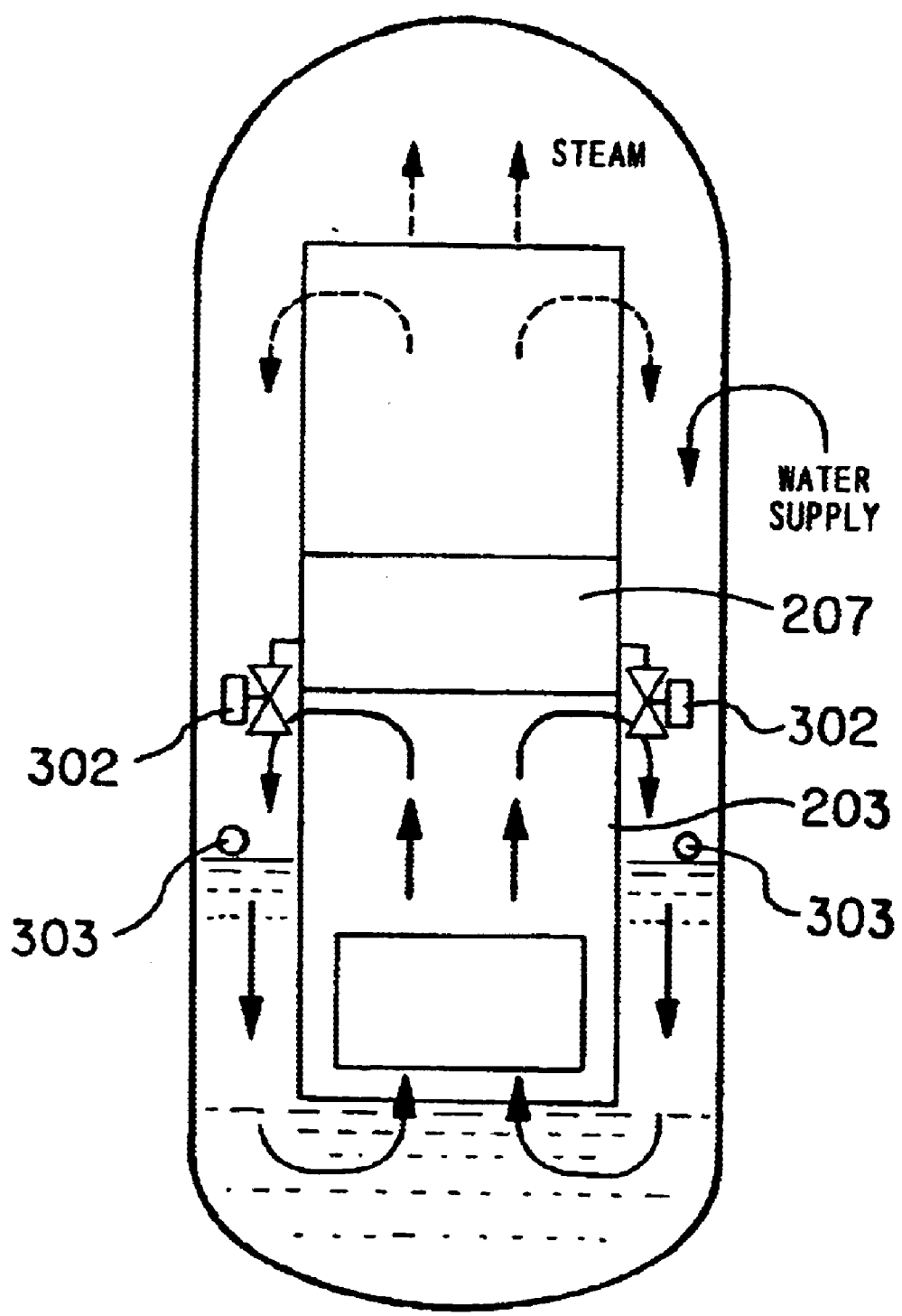
FIG. 7 is a diagram showing the state of flow of reactor core cooling water when a valve is open, according to one embodiment of the present invention.

Moreover, for example, if an ATWS (Anticipated Transient Without Scram) accident occurs, then by opening the nuclear reactor pressure vessel internal valve 302 as illustrated in FIG. 7, the length of the downcomer section 303 is shortened, and moreover, by allowing the low-density two-phase flow inside the reactor core shroud to exit, the water head pressure in the downcomer section 303 is reduced.

Consequently, the void can be increased by reducing the flow rate at the reactor core inlet, and hence the reactor core output can be restricted by addition of negative reactivity. It is also possible to apply this method for controlling output power of the plant during normal operation.

FIG. 8 shows one compositional example of a nuclear reactor pressure vessel internal valve 302.

The nuclear reactor pressure vessel internal valve 302 illustrated in FIG. 8 comprises an electrically driven or electromagnetically driven valve or the like, which directly opens and closes a water passage hole 304 which is formed by penetrating the shroud head 207, for example. This nuclear reactor pressure vessel internal valve 302 comprises a stator 306 provided in a sealed case 305, and a rotor 307 corresponding to the stator 306. A valve shaft 309 is driven to advance and withdraw in the axial direction by a ball nut 308 caused to turn by the rotor 307, in such a manner that the water passage hole 304 can be opened and closed by a valve member 310 provided on the valve shaft 309. In the example shown in FIG. 8, the valve member 310 is disposed inside the reactor core shroud 203.

FIG. 9 shows an example where the valve member 310 is disposed to the outer side of the reactor core shroud 203. Naturally, it is also possible to adopt various compositions other than those illustrated in the diagrams.

Next, a heat exchanging function by means of dry well flooding and the like will be described with reference to FIG. 10 and FIG. 11. These figures show enlarged partial sectional views of a portion of the pressure containment vessel 401: FIG. 10(A) illustrates the cooling action during normal operation as performed by a normally used cooling system, and the action inside the nuclear reactor pressure vessel 201 when the reactor water level falls.

Figure 10B:
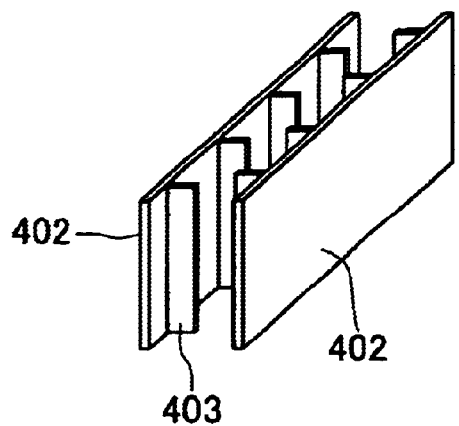
FIG. 10(B) is an enlarged perspective view showing a part of a wall of the nuclear reactor containment vessel.

As shown in FIG. 10(B), the walls 402 of the pressure containment vessel 401 comprise, for example, vertical ribs 403 on opposing sides thereof, to form a ship hull-type double-steel-plate structure.

As illustrated in FIG. 10(A), in the present embodiment, cooling water is accommodated and stored in the base section of the pressure suppression pool 404 comprised by these walls 402 and in the spaces between the opposing faces in the inner and outer circumference sections.

Furthermore, the space above the dry well 231 and the space below and to the outer side of the pool 404 are connected by means of a connecting pipe 412 provided with a normal use refrigerator 413, in such a manner that the water heated at the side of the dry well 231 is cooled by the normal use refrigerator 413 when it is circulated to the outer circumference of the pressure suppression pool 404.

Furthermore, these spaces are also connected via a coupling pipe 234 to a passive containment vessel cooling system (PCCS) pool 233 provided above the pressure suppression pool 404. Thereby, a dry well cooling system 411 is constituted.

Furthermore, as an emergency opening passage connecting to the dry well 231, a pair of upper and lower dry well flooding pipes 430, for example, are provided on the inner periphery of the pressure suppression pool 404. In addition, a valve 430a which opens in emergency condition is provided in each of these dry well flooding pipes 430. Moreover, a water injection pipe 235 for advance used water injection is provided in the pressure suppression pool 404 facing into the dry well 231, at a position between the dry well flooding pipes 430. A valve 235a is provided in the water injection pipe 235 for advance water injection, which opens prior to the valves 430a that open the dry well flooding pipes 430 in the event of an emergency. This valve 235a has a composition whereby it opens at a predetermined signal or temperature, or melts at a predetermined temperature.

The present embodiment constituted in this way has the following function.

Firstly, for cooling the inside of the dry well during normal operation of the nuclear reactor, the cooling water of the dry well cooling system 411 is circulated through gaps in the walls 402 of the nuclear reactor containment vessel 401. Chilled water of approximately 7° C., for example, is used for this cooling water. In the present embodiment, the actual volume of the dry well 231 itself is made small due to the structure of the containment vessel, as described above, and hence the internal temperature of the dry well 231 can be maintained at a prescribed temperature by the circulation of this water.

On the other hand, in the case of a loss of coolant accident in the nuclear reactor, for example, it is possible to cool the pressure containment vessel using natural driving forces only, by means of the water passing through the gaps formed by the dual-steel-plate structure of the side walls of the pressure containment vessel 401, thereby to constitute a containment vessel wall cooling system. In other words, although the water inside the pressure containment vessel 401 will reach a high temperature, the cooling water at the outer side of the pressure containment vessel 401 will not heat up and will remain at a low temperature, and therefore cooling can be performed by the natural circulation of this cooling water.

Next, supposing a severe accident wherein the reactor core fuel melts and drops onto the base of the reactor pressure vessel, water will be injected into the reactor pressure vessel 201 from the gravity driven core cooling system pipe 234. Also, the valve 235a will be opened, or melted by the temperature, and water will be injected into the dry well 231 from the water injection pipe 235. By flooding the dry well surrounding the reactor pressure vessel, the molten fuel will be cooled through the pressure vessel and damage to the lower boundary region of the nuclear reactor pressure vessel 201 can be prevented.

Thereafter, the valves 430a are opened, and water is injected from the lower-side dry well flooding pipe 430, and the water is circulated via the upper-side flooding pipe 430. By cooling the outer walls of the nuclear reactor pressure vessel 201 in this way, the concept of IVR, namely, cooling the molten fuel within the nuclear reactor pressure vessel 201, is implemented. In the boiling water reactor nuclear power plant according to the present invention, cooling of the lower border region of the nuclear reactor pressure vessel is performed easily by locating the control rod drive mechanism on the upper portion of the nuclear reactor pressure vessel.

In other words, heat exchange is performed by constructing the walls of the pressure containment vessel 401 in a ship hull-type dual-steel-plate structure, and circulating cooling water via natural circulation inside these walls 402 having a dual-steel-plate structure, in order to cool the outer side of the pressure containment vessel 401. Furthermore, since the lower dry well 231 and the pressure suppression pool 404 are connected by means of a coupling pipe 430 at two points of different connection height, an upper point through which heated water from the dry well will flow and lower point through which cooler water from the pressure suppression pool will flow as shown in FIGS. 10A and 11, then a thermal convection flow is created between the dry well 231 and the pressure suppression pool 404, and hence effective cooling can be performed.

Moreover, in the space of the lower dry well, since the spatial volume of the dry well is minimized by the filler concrete 440 on the bottom of the dry well, then when the lower dry well 231 is filled with water to cool the walls of the nuclear reactor pressure vessel 201, a natural circulation cooling effect is created wherein the walls of the nuclear reactor pressure vessel 201 form a heat generating source, and the walls of the pressure containment vessel 401 form a heat radiation source.

Consequently, stable cooling of the nuclear reactor pressure vessel side walls is performed over a long period, and the heat generated is released to the exterior if the pressure containment vessel 401, thereby suppressing increase in the pressure inside the containment vessel, whilst also restricting a severe accident to a state where the molten fuel is retained within the nuclear reactor pressure vessel 201, thereby to terminate the severe accident. In other words, the influences generated by a severe accident can be minimized, and improved safety can be realized.

Moreover, the condensed water produced inside the dry well 231 flows down to a dry well sump 409 located at the bottom part of the dry well 231, whereupon it is discharged under gravity to the reactor sump 410 provided in the nuclear reactor building 221. Therefore, it is not necessary to provide active components and devices inside the dry well 231.

Figure 12:
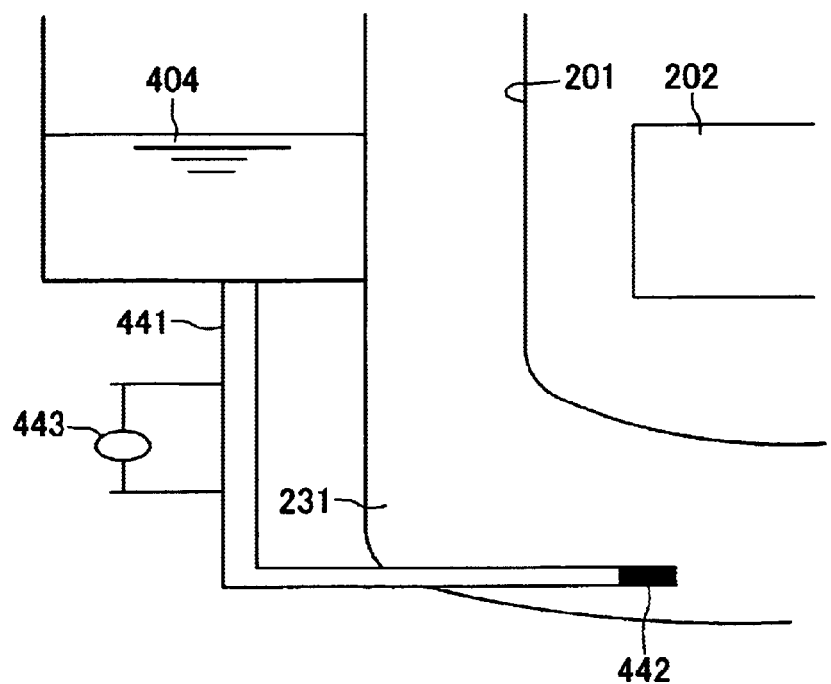
FIG. 12 is a diagram describing a severe accident automatic cooling device according to one embodiment of the present invention.

FIG. 12 is an explanatory diagram showing a severe accident automatic cooling device.

In this severe accident automatic cooling device, a normally closed water discharge pipe led from the pressure suppression pool 404 into the dry well 231 at the base region of the nuclear reactor pressure vessel 201, and heat-sensing device is employed as sealing device.

Specifically, the pressure suppression pool 404 and the base portion of the dry well 231 are connected by means of a coupling pipe 441 forming a normally close water discharge pipe. The dry well 231 base side of this coupling pipe 441 is sealed by device of a low-melting-point metal (for example, solder) 442 which forming the aforementioned heat-sensing device. Moreover, a differential pressure meter 443 is provided in the coupling pipe 441.

If a severe accident occurs and there is a melt down of the reactor core 202, the molten core material falling down from the lower portion of the nuclear reactor pressure vessel 201 to the base portion of the dry well 231 will raise the temperature in the dry well 231. As the temperature in the dry well 231 rises, the temperature of the low-melting-point metal 442 forming the seal means rises until the metal melts. By so doing, water will be discharged into the base portion of the dry well 231 under the force of gravity from the pressure suppression pool 404, thereby cooling the molten core material and hence enabling the molten material to be sealed and held inside the pressure containment vessel 401. Moreover, by means of water flowing in the coupling pipe 441, initiation of this water discharge, and thus the presence of the reactor core in the dry well, can be detected by the differential pressure meter 443.

Figure 13:
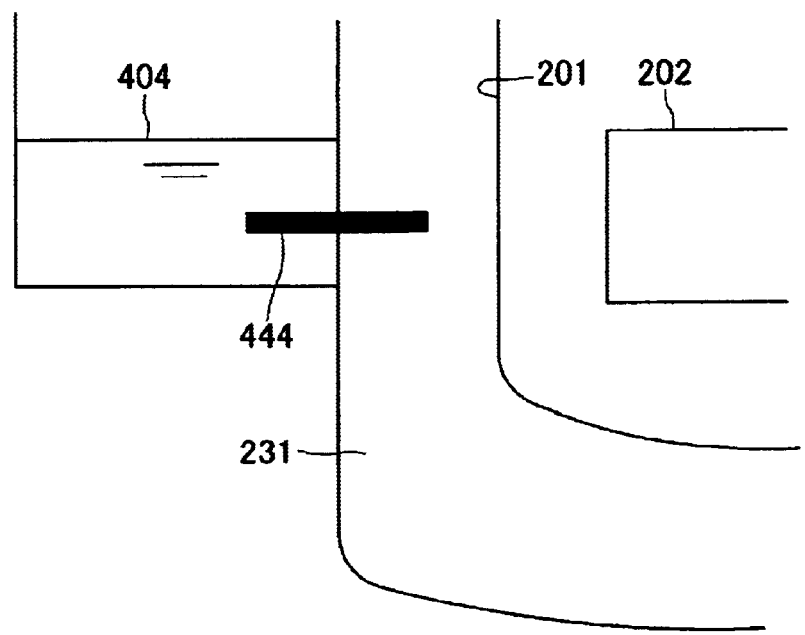
FIG. 13 is a diagram describing another severe accident automatic cooling device according to one embodiment of the present invention.

FIG. 13 shows a cooling structure based on heat exchange between a pressure suppression pool 404 and a dry well 231, using a heat pipe.

More specifically, the pressure suppression pool 404 and the dry well 231 are linked by means of a heat pipe 444. If heat is released into the dry well 231 in the event of an accident, thereby causing the temperature of the dry well 231 to rise, then the heat is transmitted by the heat pipe 444 to the pressure suppression pool 404, without requiring active devices. Thereby, the temperature and pressure of the dry well 231 can be reduced. By using a heat pipe 444, it becomes possible to restrict and terminate the accident without flooding the dry well 231.

In this way, according to the present embodiment, as cooling for the dry well 231 during normal operation, water is filled into the space within the dual-steel-plate structure constituting the pressure containment vessel 401, and chilled water (for example, water at 7° C. approximately) of an air conditioning system is supplied and circulated therein in order to cool the dry well 231 from the exterior thereof, whereby it becomes unnecessary for the dry well to be provided with active devices such as dry well cooling fans or the like.

Figure 14:
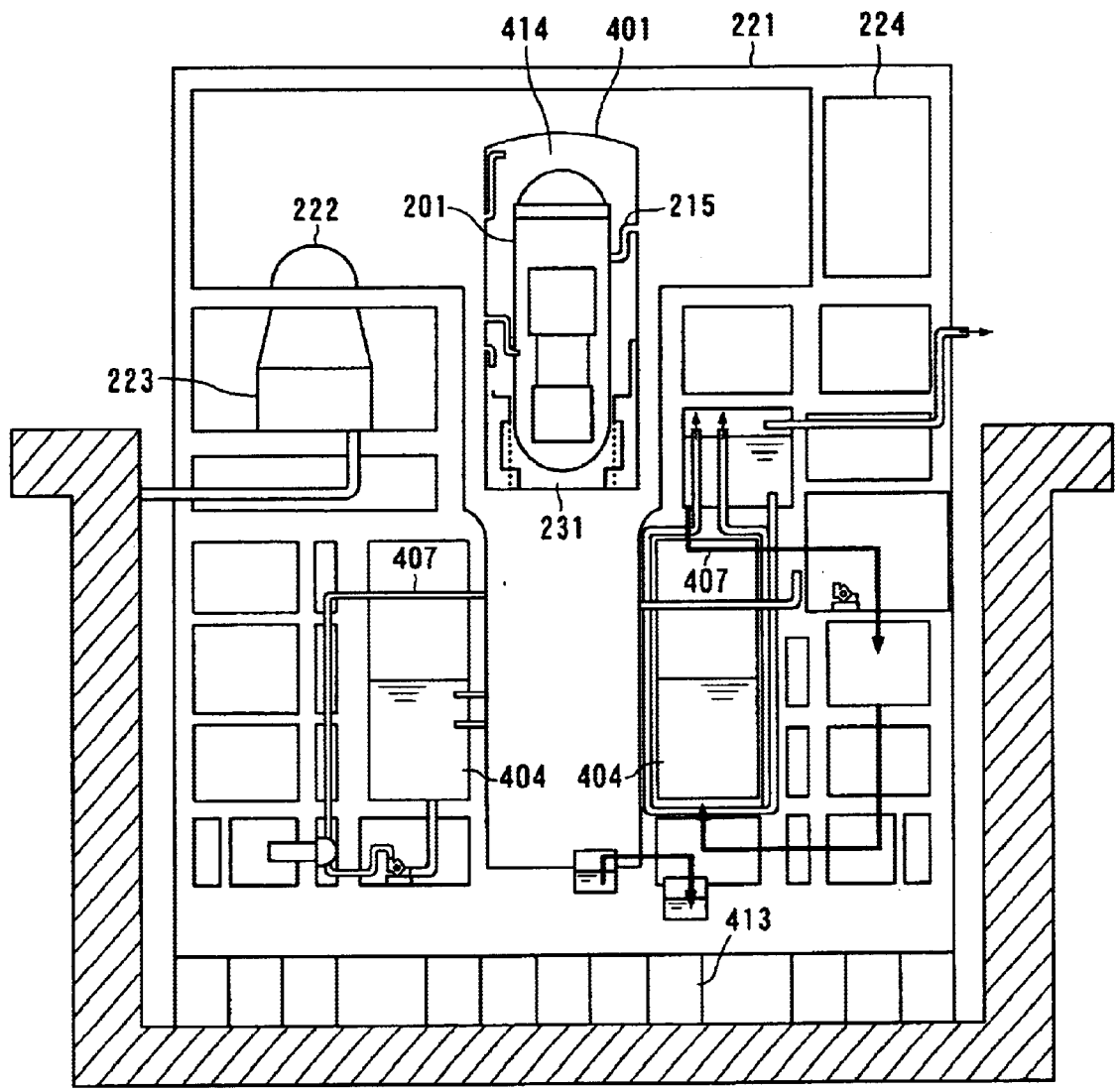
FIG. 14 is an explanatory diagram showing a raised state during replacement of the nuclear reactor pressure vessel according to one embodiment of the present invention.
Figure 15:
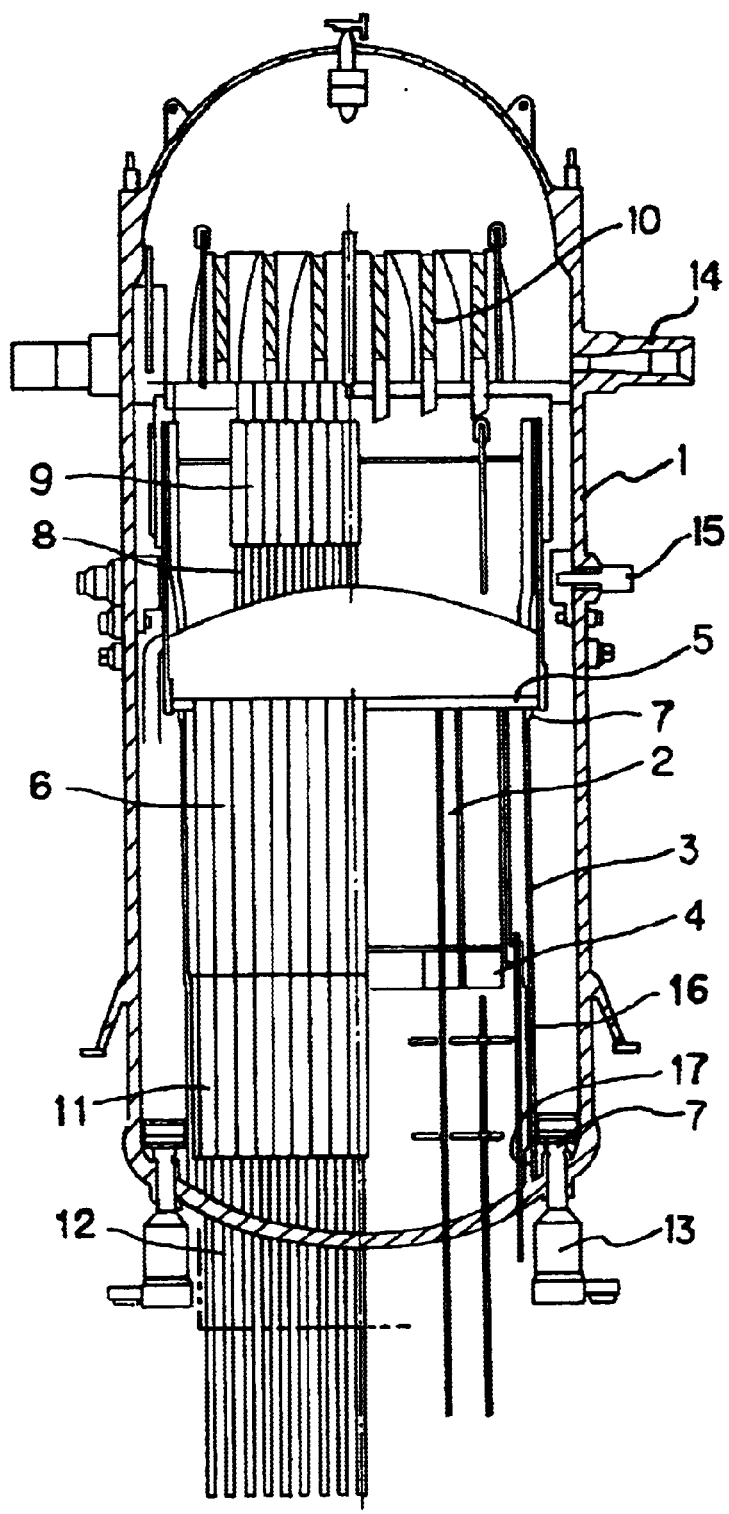
FIG. 15 is an approximate sectional view showing a conventional boiling water reactor nuclear reactor.
Figure 16:
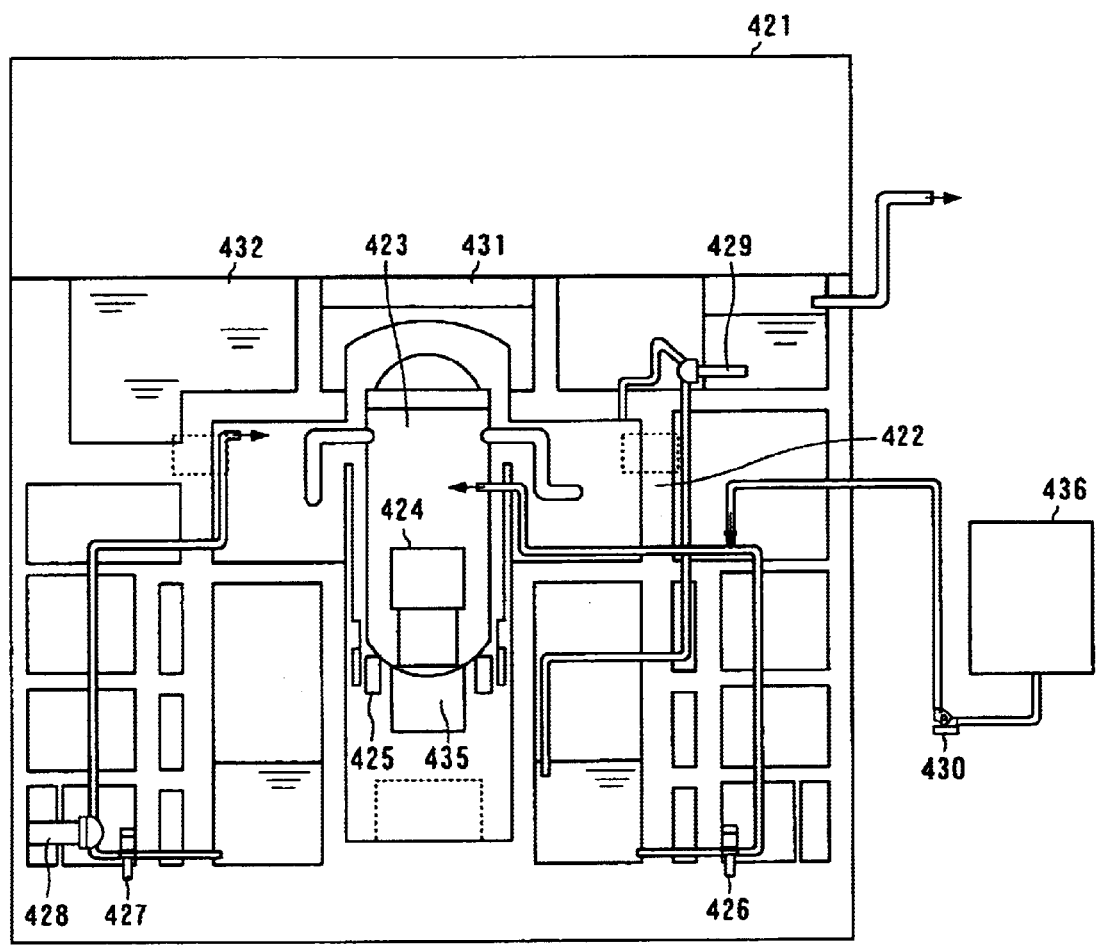
FIG. 16 is an approximate section view showing another prior art example.
Figure 17:
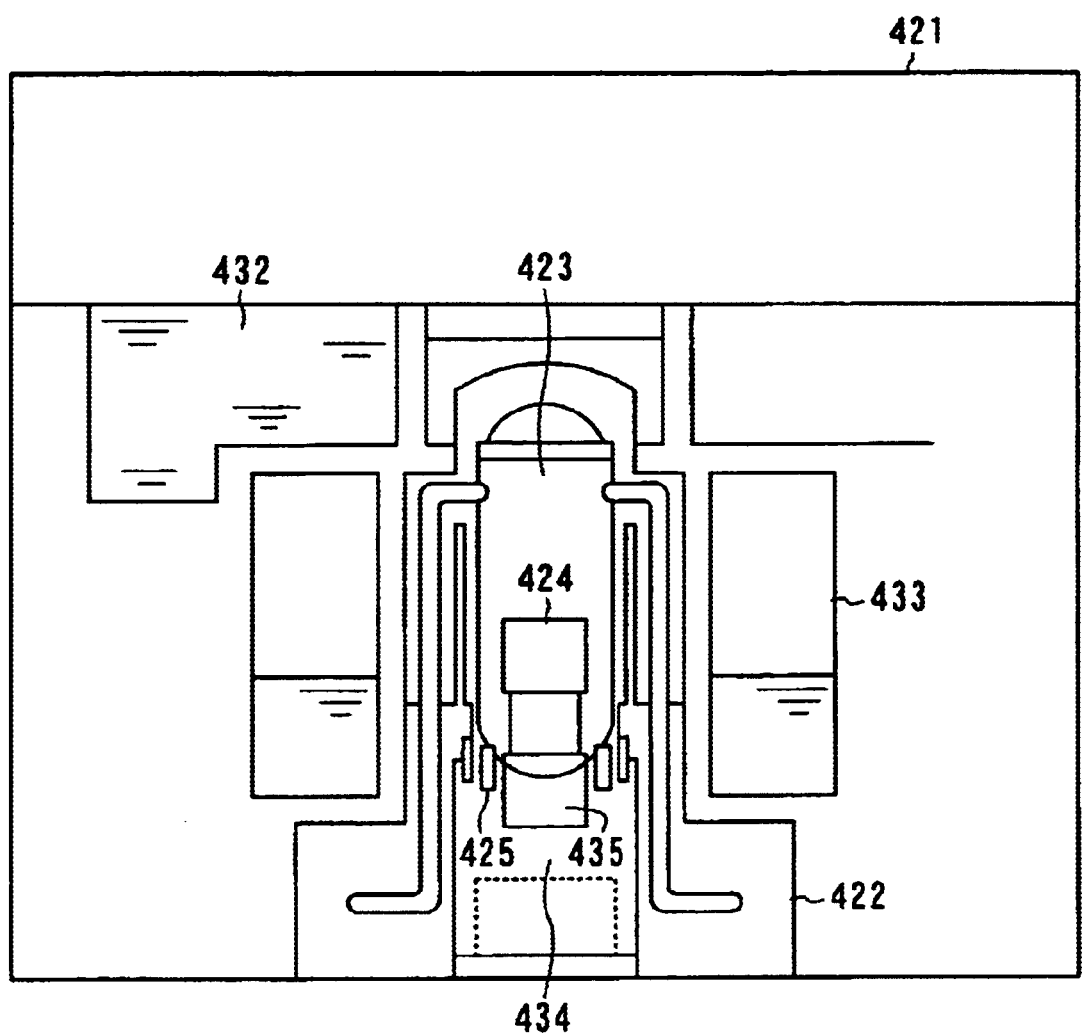
FIG. 17 is an approximate section view showing yet another prior art example.
Figure 18:
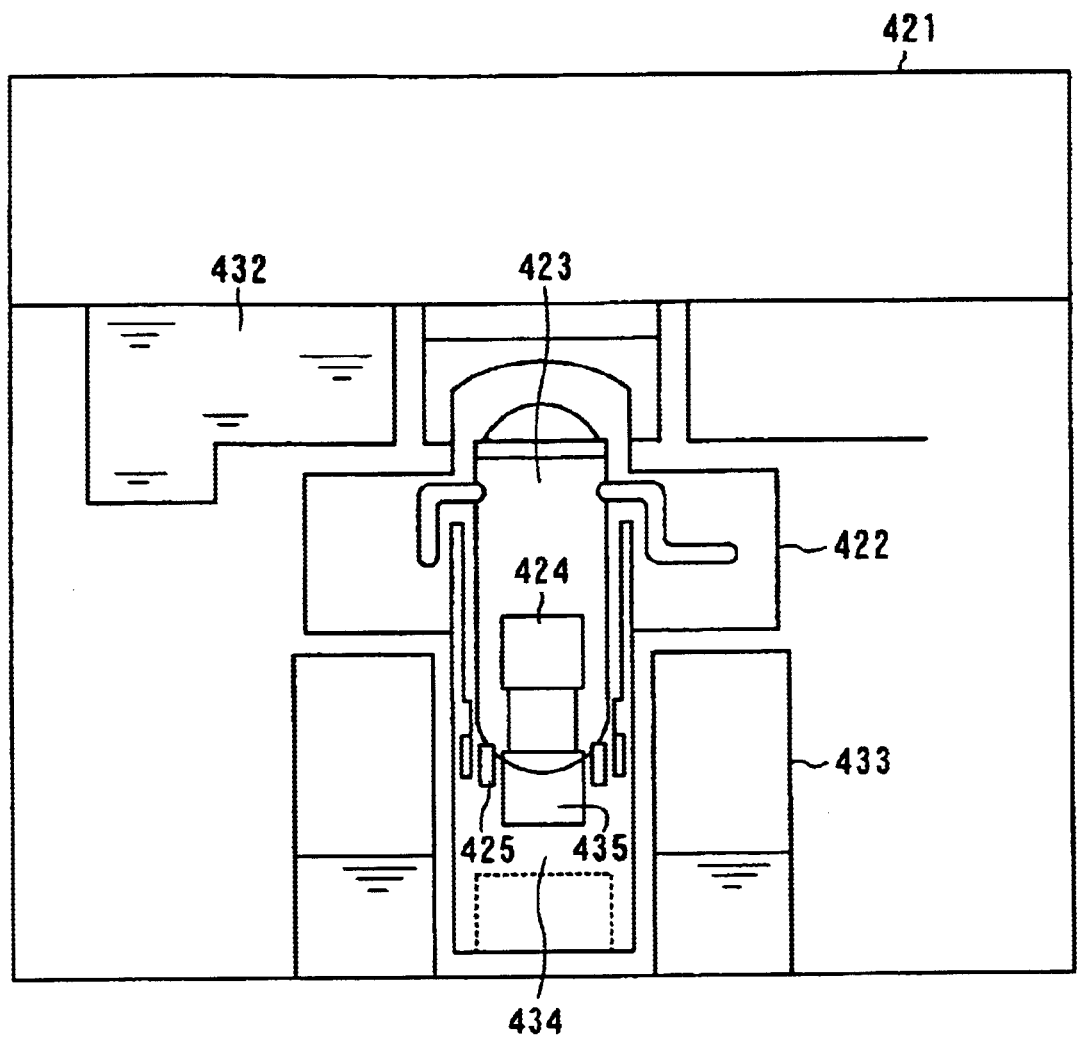
FIG. 18 is an approximate section view showing yet another prior art example.

When use of the fuel has been completed by operation for a prescribed period of time, then as illustrated in FIG. 14, the pressure containment vessel 401 is split and separated about the periphery of the nuclear reactor pressure vessel 201. Thereafter, the split nuclear reactor pressure vessel 201 together with the pressure containment vessel 401 are then lifted out into an overhead removal space (extraction space) 414, and the whole nuclear reactor pressure vessel 201 can then be exchanged readily.

In the present embodiment, an inner/outer dual-wall structure is used for the pressure containment vessel 201 on the dry well 231 side and the pressure suppression pool 404 side. Therefore, the splitting of the pressure containment vessel 401 when exchanging the nuclear reactor pressure vessel 201 can be performed efficiently by performing the splitting at a position where the dual walls are divided in the vertical direction.

Furthermore, the pressure containment vessel 401 has a dual-cylinder structure wherein the dry well 231 is positioned to the inner side thereof and the pressure suppression pool 404 is positioned to the outer side thereof. Further, a composition is adopted wherein a minimum amount of active devices such as pumps, fans and the like are placed inside the pressure containment vessel 401. In addition to this composition, devices requiring maintenance, such as pipes like the main steam pipe 215 led from the nuclear reactor pressure vessel 201, and the pressure containment vessel internal valves and the like are accommodated inside a guard pipe 407 extending from the dry well 231 portion to the dual-cylindrical structure to the exterior thereof, so that it becomes possible to perform maintenance of the valves and the like, inside the guard pipe.

Moreover, by minimizing the active devices positioned inside the dry well 231, designing the control rods 212 to be maintenance-free, eliminating active pumps such as internal pumps, by adopting a natural circulation system for the reactor internal circulation system, and adopting a nuclear reactor pressure vessel 201 top entry-insertion design for the internal reactor instrumentation and the like, then the pressure containment vessel can be made more compact, and the composition thereof can be simplified.

Furthermore, the isolation valves for the pressure containment vessel 401 are constituted by two valves provided on the exterior of the containment vessel, and the dry well sump 409 is positioned below the dry well 231, so that the gravity force can be used to discharge the water, thereby dispensing with the need to provide active devices such as sump pumps or the like into the dry well 231.

Moreover, for instance, when the valves that must be positioned within the dry well 231; the nuclear reactor pressure vessel safety relief valve; the vacuum breaker valve; the depressurization value of the emergency reactor core cooling system; the gravity driven core cooling valve; the dry well flooding valve and the like, are placed inside a guard pipe 407, so that the operators are protected from the dry well environment during maintenance, a low radiation exposure state can be maintained, and maintenance and the like can be performed easily.

Moreover, with regard to spent fuel, since the cylindrical section of the dry well 231 can be split and separated readily by means of a dual-steel-plate structure, as described above, and furthermore, since it can be separated from the pressure suppression pool and the guard pipe section whilst still united with the nuclear reactor pressure vessel 201, then by subsequently sealing the split sections of the dry well and the nuclear reactor pressure vessel 201, and filling the dry well section with water to attain a flooded cooled state. Therefore, it is possible to cool the nuclear reactor pressure vessel from the outside, and to transport the single unit to a transport ship or the like, whilst maintaining cooling of the fuel inside the nuclear reactor pressure vessel 201.

Furthermore, by being able to remove the need for a spent fuel pool and associated apparatus thereof, and using the same building for structures having different seismic grades, such as the reactor building 221 and turbine building and the like, it is possible to carry out seismic design and construction design jointly in one process. By unifying the pipes and turbines, and the like as well as the buildings, and positioning the same on an anti-seismic foundation, it is possible to standardize the whole seismic device 413 and mitigate the seismic design conditions, thereby permitting design standardization and rationalization.

Moreover, by fabricating the integrated reactor building 221 in module units in a factory, and transporting these units to the construction site, it is possible to combine only the required number of modules, hence modules can be selected according to the plant output power.

Effects of this Invention

As described above, according to an aspect of the present invention, it is possible to provide a compact and economical nuclear power plant.

According to an aspect of the invention, even if a gravity driven core cooling system forming a passive safety system is adopted, it is possible to keep a source of water for the gravity driven core cooling system in the pressure suppression pool, and hence the size of the containment vessel can be compactified.

According to an aspect of the invention, since all obstacles such as nozzles, pipes and the like can be eliminated from the area below the nuclear reactor pressure vessel, and the volume of the lower dry well can be minimized, it is possible to minimize the pool volume that is to be filled by the gravity driven core cooling system, and IVR (In Vessel Retention), namely, a retention of molten core material inside the nuclear reactor pressure vessel in order to prevent an incident from advancing, can be performed readily as a severe accident countermeasure.

According to an aspect of the invention, even if an ATWS (Anticipated Transient Without Scram) event occurs, then output power can be suppressed until the boric acid solution injection system for shutting down the nuclear reactor is operated.

According to an aspect of the invention, since removal of heat form the pressure containment vessel as required in the event of a loss of coolant accident or the like can be performed by means of a simple and compact system based on natural forces, then merits in terms of reliability and economy efficiency can be obtained.

According to an aspect of the invention, even if the reactor core has melted in a severe accident, cooling of the walls of the reactor pressure vessel and release of heat to the exterior of the pressure containment vessel can be effectively performed whilst readily retaining the molten reactor core inside the reactor pressure vessel. Furthermore, the influences of the severe accident can be kept to a minimum, thereby improving the safety of the plant.

According to an aspect of the invention, there is no need to provide active devices in the dry well, hence making the interior of the dry well a maintenance-free space and also rationalizing the required space.

According to an aspect of the invention, even if a reactor core melt down occurs, cooling and isolation of the molten material can be achieved without providing active devices inside the pressure containment vessel. Moreover, abnormal conditions can also be detected reliably.

According to an aspect of the invention, it is possible to transmit heat released into the dry well in the event of an accident, to the pressure suppression pool without using active devices, and hence the accident can be terminated without flooding the dry well. Thereby, the reliability of the plant can be increased.

According to an aspect of the invention, it becomes unnecessary for operators to enter inside the dry well, which is a high-radiation area, for performing maintenance of valves and the like. Further, the maintenance work can be performed inside a partially restricted guard pipe only, thereby reducing the radiation exposure of the operators.

According to an aspect the invention, the same building can be used for all of the facilities, and hence an economic merit is obtained.

According to an aspect of the invention, it is possible to exchange the whole nuclear reactor pressure vessel including the dry well cylinder section in one unit.

According to an aspect of the invention, by positioning the integrated nuclear reactor building module on a foundation having an anti-seismic structure, standardized design for both the building and the devices and equipment can be achieved readily.

According to an aspect the invention, by fabricating integrated building modules in a factory and transporting the modules to the construction site, it is possible to arbitrarily select the plant output as required by installing only the required number of modules at the construction site.

What is claimed is:

1. A boiling water reactor nuclear power plant, in which a cooling water is circulated, comprising, in an installed state thereof:
   a reactor building;
   a reactor containment vessel positioned in the reactor building; said reactor containment vessel having dual cylindrical structure having inner and outer wall sections;
   a reactor pressure vessel disposed inside the containment vessel;
   a dry well defined, inside the reactor containment vessel, by the inner wall section thereof;
   a pressure suppression pool provided inside the reactor containment vessel and outside the dry well between the inner and outer wall sections of the reactor containment vessel;
   a containment vessel cooling system pool disposed above the suppression pool;
   a reactor core mounted with fuel assemblies supported by a reactor core support plate and an upper grid plate provided plate provided in an inner base portion of the reactor pressure vessel, said reactor core being disposed below said pressure suppression pool;

a reactor core shroud surrounding the reactor core and the upper grid plate; control rod guide tubes positioned in the reactor core shroud and over the upper grid plate;

control rods inserted in the control rod guide tubes; and control rod drive mechanisms operative for inserting and withdrawing the control rods from an upper portion of the reactor core, said control rod drive mechanisms being arranged at a portion above the control rod guide tubes and inside the reactor core shroud, said inner and outer wall sections of the reactor containment vessel having an inner hollow structure, the double-wall structure being communicated with the containment vessel cooling system pool, wherein said cooling water therein flows and circulates in the hollow portion of the double-wall structure to cool the dry well, the double-wall structure being provide with a plurality of ribs.

2. The boiling water reactor nuclear power plant according to claim 1, wherein said pressure suppression pool being connected to said nuclear reactor pressure vessel by means of gravity-based piping through which the cooling water drops by gravity.

3. The boiling water reactor nuclear power plant according to claim 1, wherein a piping and nozzles connected to said nuclear reactor pressure vessel are positioned above said reactor core.

4. The boiling water reactor nuclear power plant according to claim 1, wherein a valve operable to open to an exterior of said reactor core shroud is provided at a position above said fuel assembly.

5. The boiling water reactor nuclear power plant according to claim 1, wherein said pressure suppression pool and a lower portion of the dry well are connected by means of a plurality of emergency opening passages at different elevational positions.

6. The boiling water reactor nuclear power plant according to claim 1, wherein a normal use cooling system is connected to the inner hollow structure of the reactor containment vessel wall.

7. The boiling water reactor nuclear power plant according to claim 1, wherein a normally-closed water discharge pipe is led from said pressure suppression pool into said dry well at a base region of said nuclear reactor pressure vessel, and said water discharge pipe is normally closed by a sealing device capable of being released in case of emergency so as to open said water discharge pipe.

8. The boiling water reactor nuclear power plant according to claim 1, wherein a heat pipe capable of exchanging heat is provided at a portion between said pressure suppression pool and a lower region of said dry well.

9. The boiling water reactor nuclear power plant according to claim 1, wherein a guard pipe is provided so as to extend from said dry well section to said pressure suppression pool, and valves and piping led from said nuclear reactor pressure vessel are accommodated in said guard pipe.

10. The boiling water reactor nuclear power plant according to claim 1, wherein a turbine system is installed on an upper portion of the reactor building.

11. The boiling water reactor nuclear power plant according to claim 1, wherein an extraction space capable of accommodating said nuclear reactor pressure vessel is provided above the nuclear reactor pressure vessel in the reactor building.

12. The boiling water reactor nuclear power plant according to claim 1, wherein said reactor building is positioned on a foundation base having an anti-seismic structure.

13. A reactor containment vessel for use with a boiling water nuclear reactor having a reactor containment vessel cooling system providing cooling water, comprising:

an inner wall made from multiple steel plates defining an inside of the reactor containment vessel;

an outer wall made from multiple steel plates, wherein the inner wall and the outer wall are positioned to form a double-wall structure forming an inner hollow structure over at least a portion of the reactor containment vessel;

a plurality of ribs provided within the inner hollow structure and coupled to either or both of the inner wall and the outer wall and;

a fluidic connection to the reactor containment vessel cooling system configured so that cooling water from the reactor containment vessel cooling system flows and circulates in the inner hollow structure to cool a portion of the inside of the reactor containment vessel.

* * * * *